United States Patent
Ahunai et al.

(10) Patent No.: US 12,062,766 B2
(45) Date of Patent: Aug. 13, 2024

(54) EXTERNAL COOLING SYSTEM AND METHOD FOR SEGMENTED BATTERY MODULES MOUNTED WITHIN AN ELECTRIC VEHICLE

(71) Applicant: MINE MOBILITY RESEARCH CO., LTD., Bangkok (TH)

(72) Inventors: Somphote Ahunai, Bangkok (TH); Wimolmas Wongmakornpan, Bangkok (TH); Charet Akkarabantheongjai, Bangkok (TH); Janesak Sudsangtienchai, Bangkok (TH); Pun Praphanphoj, Bangkok (TH); Karun Dansiri, Bangkok (TH)

(73) Assignee: MINE MOBILITY RESEARCH CO., LTD., Bangkok (TH)

( * ) Notice: Subject to any disclaimer, the term of this patent is extended or adjusted under 35 U.S.C. 154(b) by 276 days.

(21) Appl. No.: 17/673,568

(22) Filed: Feb. 16, 2022

(65) Prior Publication Data

US 2022/0263148 A1 Aug. 18, 2022

(30) Foreign Application Priority Data

Feb. 18, 2021 (SG) .......................... 10202101656Q

(51) Int. Cl.
*H01M 10/613* (2014.01)
*B60L 53/60* (2019.01)
*B60L 58/18* (2019.01)
*B60L 58/26* (2019.01)
*H01M 10/42* (2006.01)
(Continued)

(52) U.S. Cl.
CPC .......... *H01M 10/613* (2015.04); *B60L 53/60* (2019.02); *B60L 58/18* (2019.02); *B60L 58/26* (2019.02); *H01M 10/425* (2013.01); *H01M 10/482* (2013.01); *H01M 10/625* (2015.04); *H01M 10/63* (2015.04); *H01M 10/6568* (2015.04);
(Continued)

(58) Field of Classification Search
CPC .. H01M 10/613; H01M 10/625; H01M 10/63; H01M 10/6568; H01M 10/425; H01M 10/482; B60L 53/60; B60L 58/18; B60L 58/26
See application file for complete search history.

(56) References Cited

U.S. PATENT DOCUMENTS

2020/0331504 A1 10/2020 Glinka
2021/0146776 A1* 5/2021 Bollinger ............ H01M 10/425

* cited by examiner

*Primary Examiner* — Michael D Lang
(74) *Attorney, Agent, or Firm* — JCIP; Joseph G. Chu; Jeremy I. Maynard

(57) ABSTRACT

A system or method for individualized coolant flow to each of a plurality of energy storage devices 10 housed in an electric vehicle. Each energy storage device 10 includes a heat exchanger 11 coupled in thermal conductivity with a segmented battery module 13. The segmented battery module 13 includes battery cells 13B and sensors (13C, 13D, and 13E). The heat exchanger 11 includes an HE flow controller 11C. Individual sensor information for each energy storage device 10 is collected via the BMU 13A of each segmented battery module 13. The charging SCC 22 uses this individual sensor information to calculate the HE flow rate of coolant pumped through each energy storage device's 10 heat exchanger 11 to cool the battery cells 13B of the energy storage device 10. Coolant delivered to the heat exchangers 11 is cooled by an external cooling unit 21 of a power source 20 during each charging session.

18 Claims, 10 Drawing Sheets

(51) Int. Cl.
*H01M 10/48* (2006.01)
*H01M 10/625* (2014.01)
*H01M 10/63* (2014.01)
*H01M 10/6568* (2014.01)

(52) U.S. Cl.
CPC .................. *B60L 2240/545* (2013.01); *H01M 2010/4271* (2013.01)

EXTERNAL COOLING SYSTEM AND METHOD FOR SEGMENTED BATTERY MODULES MOUNTED WITHIN AN ELECTRIC VEHICLE

RELATED APPLICATIONS

The current application claims priority to, and the benefits of, the Singapore Patent Application No. 102021656Q with the filing date of Feb. 18, 2021, the content of which is incorporated in its entirety by reference herein.

TECHNICAL CONTRIBUTION

The present disclosure relates to cooling systems and methods for battery cells of electric vehicles. More particularly, the present disclosure relates to a system and method for individualized cooling of segmented battery modules mounted within an electric vehicle.

BACKGROUND

Use of battery power for larger electric vehicles, such as locomotives, is an emerging field of development with great potential for reducing infrastructure expenses. Overhead electric lines or third rail electric power systems are not required when employing battery power for locomotives. Legacy train rails designed for diesel-powered locomotives, for instance, can be used for battery powered locomotives without any retrofit of the train rails. The use of battery power for these large electric vehicles, however, introduces additional challenges resulting from the charging and discharging of the battery cells.

The larger electric vehicles are generally recharged at a power source that includes a power supply. Electric buses, trolleys, and locomotives often connect to the power supply of the power source via a pantograph arrangement on the roof of the electric vehicle. The power supply can also be received via umbilical cables between the power source and the electric vehicle.

To reduce downtime of the equipment, the battery cells of the electric vehicles can be charged in a short time frame with a higher current, such as a 3 C current that is three times the discharge current of the electric vehicle during motorized operation. Following Joule's first law, heat generation from the charging current in a battery cell during charging with three times the maximum discharge current is roughly proportional to the square of the current passing through the battery cell, not considering other losses in the system. Hence charging with three times the maximum discharge current for a battery cell may result in roughly nine times greater heat generation during charging.

The higher current loads during charging sessions can quickly generate heat that drives the temperature of the charging battery cells outside their preferred operating temperature tolerances. If the preferred temperature ranges of the battery cells are not maintained, the battery lifespan can be shortened and the battery charging capacity can be diminished.

Particularly during charging, battery cell cooling is a critical design requirement for larger electric vehicles. The preferred charging temperature range for battery cells is typically narrower than the preferred discharging temperature range for the same battery. Lithium-based battery cells, for instance, have a preferred charging temperature range from about 0° C. to 45° C. and a preferred discharging temperature range from −20° C. to 60° C. Nickel-based battery cells similarly have a preferred charging temperature range from about 0° C. to 45° C. and a preferred discharging temperature range from −20° C. to 65° C.

The cooling of battery cells in larger electric vehicle is addressed by U.S. Patent Application No. 2020/0331504A1 entitled "Track-Guided Vehicle, Arrangement for Cooling an Energy Storage Device of the Track-Guided Vehicle, and Method for Controlling the Arrangement" published on 22 Oct. 2020. In this publication's disclosed design, a coolant is driven through an energy storage device of the electric vehicle to cool the battery cells. The design includes a temperature sensor within the energy storage device for monitoring the temperature of the battery cells and controlling the cooling system.

Battery cells for larger electric vehicles are often mounted within battery modules. Each battery module may include its own set of sensors in data communication with an enclosed battery management unit (BMU). Sensors for a battery module can include a temperature sensor, a current sensor, and a voltage sensor. The sensor information feedback from the BMU of each battery module is particularly useful in controlling a charging session for a larger electric vehicles with tens of battery modules. The state of charge (SOC), voltage requirements, and/or current requirements of each of the battery modules may differ due to the design, age, and operating history of the battery module.

Each BMU can transmit sensor information to a master battery management system (MBMS). The MBMS can in turn be in data communication with a controller housed in the electric vehicle. The MBMS can also have its own sensors, such as temperature sensors, voltage sensors, and current sensors. Data communication between each BMU and the MBMS as well as data communication between the MBMS and the controller of the electric vehicle can be accomplished via an assortment of proprietary communication protocols or standardized communication protocols. The data communication can be accomplished via wired or via wireless communication.

What is needed in the art is a segmented cooling architecture that leverages both the sensor information collected by modern BMUs and addresses the individual cooling needs of each of the battery modules within an electric vehicle. In the background art, differences in temperature (and other measurable conditions of the battery modules) are not utilized by the cooling system. In the background art, for instance, equal flow of coolant is sent to each battery module of the electric vehicle regardless of the temperature differences between the battery modules.

SUMMARY

In its most general form, the internal cooling system and method for segmented battery modules within an electric vehicle provides individualized coolant flow to each of a plurality of energy storage devices housed in the electric vehicle. Each energy storage device includes a heat exchanger coupled in thermal conductivity with a segmented battery module. The segmented battery module includes battery cells and sensors. The heat exchanger includes an HE flow controller. Individual sensor information for each energy storage device is collected via the BMU of each segmented battery module. The internal SCC uses this individual sensor information to calculate the HE flow rate of coolant pumped through each energy storage device's heat exchanger to cool the battery cells of the energy storage device. Coolant delivered to the heat exchangers is cooled by an internal cooling unit during each charging session, and can also be cooled by the internal cooling unit during motorized operation of the electric vehicle.

A first embodiment of the internal cooling invention is an internal cooling system for a plurality of segmented battery modules. The system comprises: (a) a plurality of energy storage devices, each energy storage device including a heat exchanger and one of the segmented battery modules; (b) an electrical connection; (c) an internal cooling unit with an ICU inlet and an ICU outlet; (d) a pair of coolant trunks; and (e) an internal segmented cooling controller (SCC) including a set of parameters. The internal SCC is configured to directly or indirectly receive the sensor information collected by the BMU of each energy storage device wirelessly or by wire via the BMU connector of the energy storage device, the sensor information includes at least temperature information measured by the at least one temperature sensor located within the segmented battery module of the energy storage device. The set of parameters include at least a preferred temperature range for the segmented battery module of each energy storage device. The internal SCC is configured to periodically: (1) calculate or recalculate an optimal range for the HE flow rate of the heat exchanger of each energy storage device; and (2) control by wire or wirelessly the HE flow rate of each energy storage device, via the direct or indirect data communication with the HE flow controller of the energy storage device, to maintain the HE flow rate within the optimal range. The optimal range is a function of: (a) the sensor information received by the internal SCC from the sensors of the energy storage device via the BMU of the energy storage device; and (b) the preferred temperature range for the energy storage device.

A second embodiment of the internal cooling invention is a computer-implemented internal cooling method for a plurality of segmented battery modules. The method comprises: (a) maintaining a plurality of energy storage devices, each energy storage device including a heat exchanger and one of the segmented battery modules; (b) maintaining an electrical connection; (c) maintaining an internal cooling unit with an ICU inlet and an ICU outlet; (d) maintaining a pair of coolant trunks; (e) maintaining an internal segmented cooling controller (SCC) including a set of parameters; (f) periodically employing the internal SCC to calculate or recalculate an optimal range for the HE flow rate of the heat exchanger of each energy storage device; and (g) controlling by wire or wirelessly the HE flow rate of each energy storage device, via the direct or indirect data communication with the HE flow controller of the energy storage device, to maintain the HE flow rate within the optimal range. The internal SCC is configured to directly or indirectly receive the sensor information collected by the BMU of each energy storage device wirelessly or by wire via the BMU connector of the energy storage device, the sensor information including at least temperature information measured by the at least one temperature sensor located within the segmented battery module of the energy storage device. The set of parameters include at least a preferred temperature range for the segmented battery module of each energy storage. The optimal range is a function of: (i) the sensor information received by the internal SCC from the sensors of the energy storage device via the BMU of the energy storage device; and (ii) the preferred temperature range for the energy storage device.

In its most general form, the external cooling system and method for segmented battery modules within an electric vehicle provides individualized coolant flow to each of a plurality of energy storage devices housed in the electric vehicle. Each energy storage device includes a heat exchanger coupled in thermal conductivity with a segmented battery module. The segmented battery module includes battery cells and sensors. The heat exchanger includes an HE flow controller. Individual sensor information for each energy storage device is collected via the BMU of each segmented battery module. The charging SCC uses this individual sensor information to calculate the HE flow rate of coolant pumped through each energy storage device's heat exchanger to cool the battery cells of the energy storage device. Coolant delivered to the heat exchangers is cooled by an external cooling unit of a power source during each charging session.

A first embodiment of the external cooling invention is an external cooling system for a plurality of segmented battery modules. The system comprises an electric vehicle paired with a power source: (a) a plurality of energy storage devices housed in the electric vehicle, each energy storage device including a heat exchanger and one of the segmented battery modules; (b) an electrical connection housed in the electric vehicle; (c) a master battery management system (MBMS) housed in the electric vehicle; (d) an external cooling unit housed in the power source, the external cooling unit including an ECU inlet and an ECU outlet; (e) a pair of coolant trunks housed in the electric vehicle; and (f) a charging segmented cooling controller (SCC), the charging SCC including a set of parameters. During each charging session the charging SCC is configured to periodically: (1) calculate or recalculate an optimal range for the HE flow rate of the heat exchanger of each energy storage device; and (2) control by wire or wirelessly the HE flow rate of each energy storage device, via the direct or indirect data communication with the HE flow controller of the energy storage device, to maintain the HE flow rate within the optimal range. The optimal range is a function of: (a) the sensor information received by the charging SCC from the sensors of the energy storage device via the BMU of the energy storage device; and (b) the preferred temperature range for the energy storage device.

A second embodiment of the external cooling invention is a computer-implemented external cooling method for a plurality of segmented battery modules. The method comprises: (a) maintaining a plurality of energy storage devices in an electric vehicle, each energy storage device including a heat exchanger and one of the segmented battery modules; (b) maintaining an electrical connection in the electric vehicle; (c) maintaining a master battery management system (MBMS) in the electric vehicle; (d) maintaining an external cooling unit in a power source, the external cooling unit including an ECU inlet and an ECU outlet; (e) maintaining a pair of coolant trunks in the electric vehicle; (f) maintaining a charging segmented cooling controller (SCC), the charging SCC including a set of parameters; (g) commencing the charging session for one or more energy storage devices; (h) during the charging session, periodically employing the charging SCC to calculate or recalculate an optimal range for the HE flow rate of the heat exchanger of each energy storage device; and (i) during the charging session, controlling by wire or wirelessly the HE flow rate of each energy storage device, via the direct or indirect data communication with the HE flow controller of the energy storage device, to maintain the HE flow rate within the optimal range. The step of commencing the charging session includes: (i) connecting the master battery management system (MBMS) to the charging SCC; and (ii) connecting the electrical connection to one or more power supplies via one or more electrical connection connectors. The optimal range is a function of: (i) the sensor information received by the charging SCC from the sensors of the energy storage device via the BMU of the energy storage device; and (ii) the preferred temperature range for the energy storage device.

The segmented cooling architecture of the invention, whether employing an internal cooling unit or an external cooling unit, leverages the sensor information collected by each of the BMUs in the electric vehicle. With this sensor information, the SCC can prioritize the individual cooling needs of the segmented battery modules. The primary benefit of the invention is that the battery cells of individual segmented battery modules are sheltered from the effects of improper temperature control, which can damage the battery cells or shorten the battery cell life cycle.

A secondary benefit is that the internal cooling unit or external cooling unit can operate at a lower power rating when using the invention, because the coolant is specifically distributed to where it is most needed. This targeted approach reduces the requisite size of the cooling unit and the amount of energy used by the cooling unit. A smaller and lower power cooling unit can be installed within the electric vehicle because the overall coolant production need is reduced due to the invention's targeted distribution of coolant.

A third benefit is achieved when using the external cooling unit design. As governed by Joule's first law, heat generation from the charging current in a battery cell is proportional to the square of the current passing through the battery cells, not considering other losses in the system. Charging current can often be two, three, or four times the maximum discharge current used during motorized operation of the electric vehicle. Hence, the heat generated within the battery cells during a charging session can be, for instance, nine times greater than the heat generated during discharge of the battery cells (e.g., during motorized operation of the electric vehicle) if three times the maximum discharge current is undertaken. As a result, large quantities of coolant are mostly required at the location of the charging (e.g., at the power source when the electric vehicle is electrically connected to a power supply during a charging session), for instance where the roughly 9× heat generation occurs during charging with three times the maximum discharge current.

During motorized operation of the electric vehicle, less expensive and lower power cooling means (such as ambient air cooling, forced air cooling, or air conditioning cooling) than water cooling may suffice. Assuming a charging session with three times the maximum discharge current, the discharge current during motorized operation is only about one third the charging current, thus the heat generation during motorized operation is also one about one ninth the heat generated during an example charging session with three times the maximum discharge current. Also, during motorized operation of an electric vehicle, any single segmented battery module with a high temperature can be quickly shut down without impacting the locomotion of the electric vehicle, as other segmented battery modules of lower temperature can be used to power the electric vehicle while the overheated segmented battery module is permitted to cool down.

With the use of an external cooling unit design, a robust cooling system can be housed at a power source. The expense of the robust cooling system can be amortized over its use to charge multiple electric vehicles each day of the year. Also, with use of an external cooling unit, the electric vehicle is spared the additional weight load, volumetric space, and expense of the installation of an internal cooling unit within the electric vehicle. In place of a large internal cooling unit, the extra weight allocation and volumetric space can be allocated, for instance, to the installation of additional segmented battery modules within the electric vehicle to extend the travel distance of the electric vehicle between charging sessions.

BRIEF DESCRIPTION OF THE DRAWINGS

Embodiments of the present disclosure are described herein with reference to the drawings in which.

DETAILED DESCRIPTION

In the following detailed description, reference is made to the accompanying drawings, which form a part hereof. The illustrative embodiments described in the detailed description, drawings and claims are not meant to be limiting. Other embodiments can be utilized, and other changes can be made, without departing from the spirit or scope of the subject matter presented herein. Unless specified otherwise, the terms "comprising," "comprise," "including" and "include" used herein, and grammatical variants thereof, are intended to represent "open" or "inclusive" language such that they include recited elements but also permit inclusion of additional, unrecited elements. Data communication can be accomplished via wired or wireless means; data communication can be implemented directly between components or indirectly between components.

Figure 1:
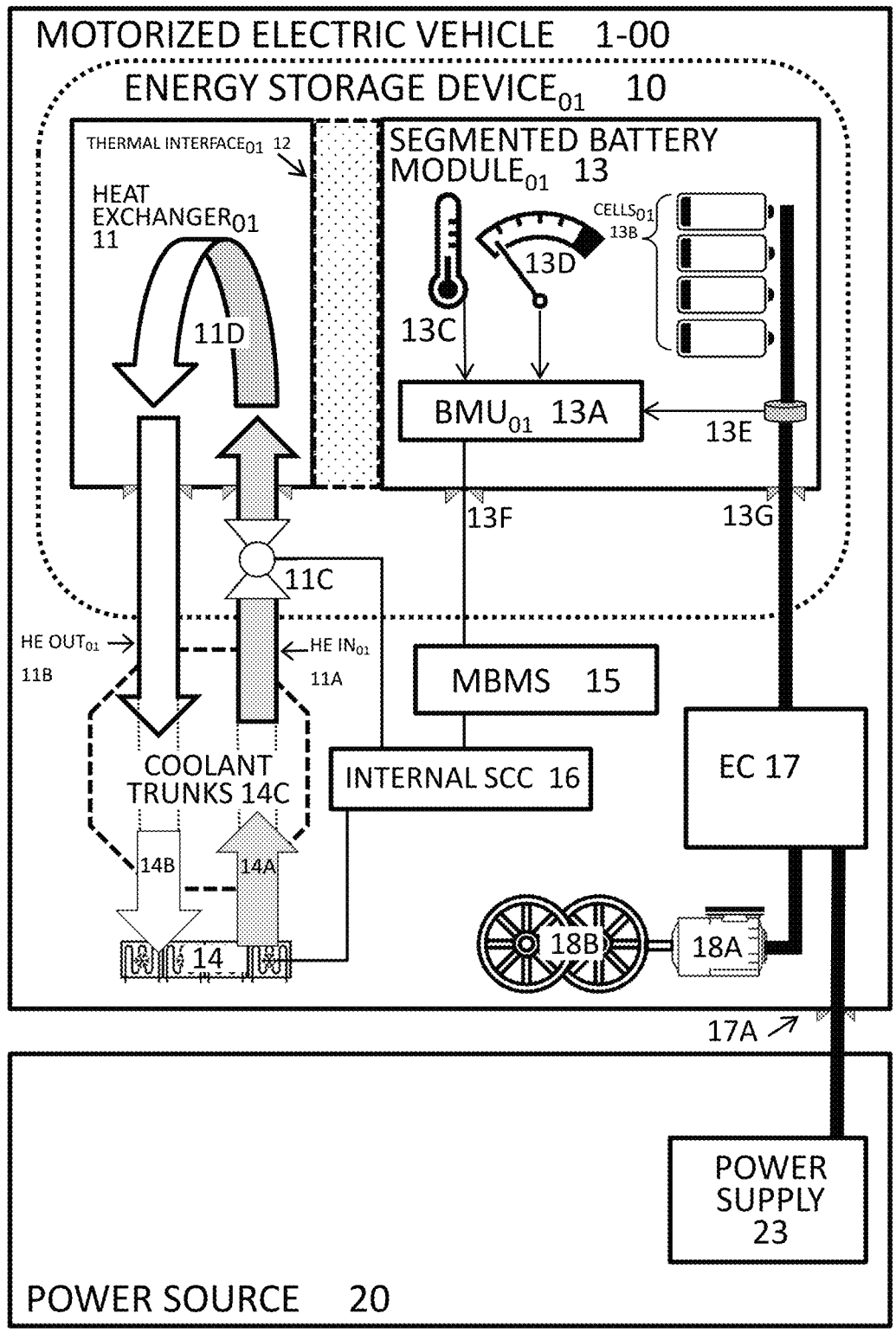
FIG. 1 is a block diagram representing an internal cooling system housed in a motorized electric vehicle, in electrical connection to a power supply of a power source during a charging session, in an embodiment of the invention.

FIG. 1 is a block diagram representing an internal cooling system housed in a motorized electric vehicle 1-00, in electrical connection to a power supply 23 of a power source 20 during a charging session, in an embodiment of the invention. The motorized electric vehicle 1-00 includes a plurality of energy storage devices 10, a pair of coolant trunks 14C, an internal cooling unit 14, MBMS 15, an internal segmented cooling controller (SCC) 16, an electrical connection 17, and at least one traction motor 18A for driving wheels 18B. The energy storage device 10 includes an optional thermal interface 12 between a heat exchanger 11 and a segmented battery module 13. The heat exchanger 11 includes an HE inlet 11A, an HE outlet 11B, an HE flow controller 11C, and a plurality of HE passages 11D. While illustrated in FIG. 1 as a flow valve, the HE flow controller 11C can be a flow valve, a variable speed drive (VSD) coolant pump, or a combination of the two. The HE flow controller 11C is directly or indirectly controlled by the internal SCC 22 by wired or wireless communication to increase or decrease coolant flow through the segmented coolant pathways as needed. The HE flow controller 11C is in wired or wireless data communication with the internal SCC 22.

As illustrated in FIG. 1, the segmented battery module 13 includes: (i) a plurality of battery cells 13B in electrical connection to an electrical connection connector 17A; and (ii) a battery management unit (BMU) 13A in data communication with a temperature sensor 13C, a voltage sensor 13D, and a current sensor 13E. The internal SCC 16 includes a set of parameters. For simplicity in FIG. 1, just one energy storage device 10, 01 of N, and its components are depicted.

FIG. 1 illustrates a segmented coolant pathway for an internal cooling system embodiment of the invention. For each energy storage device 10, the segmented coolant pathway exits from the internal cooling unit 14 via the ICU outlet 14A, through the cool trunk 14C-1 (not shown in FIG. 1, see FIG. 3) of the pair of coolant trunks 14C, through the HE inlet 11A of the energy storage device 10, through the HE passages 11D of the energy storage device 10, through the HE outlet 11B of the energy storage device 10, through the warm trunk 14C-2 (not shown in FIG. 1, see FIG. 3) of the pair of coolant trunks 14C, and back into the internal cooling unit 14 via the ICU inlet 14B. The segmented coolant pathway passes through the HE flow controller 11C of the energy storage device 10. When coolant is pumped through each segmented coolant pathway, there is an HE flow rate through the HE flow controller 11C of the energy storage device 10, the HE flow controller 11C can regulate this HE flow rate. In this embodiment, there is no flow of coolant between the motorized electric vehicle 1-00 and the power source 20.

FIG. 1 illustrates data communication connections from the sensors (13C, 13E, and 13E) to the BMU 13A, to the MBMS 15 wirelessly or by wire via the BMU connector 13F, to the internal SCC 16. The internal SCC 16 is also in data communication with the internal cooling unit 14.

FIG. 1 illustrates electrical power connections between: (i) the battery cells 13B of each energy storage device 10 and the electrical connection 17 via the battery connector 13G of the energy storage device 10; (ii) the electrical connection 17 and the at least one traction motor 18A driving the wheels 18B; and (iii) the power supply 23 of the power source 20 and the electrical connection 17 via the electrical connection connector 17A.

While not illustrated in FIG. 1, the invention can also be implemented as a power car. Power cars do not have traction motors 18A but have wheels 18B. Power cars include a power outlet that can be connected to a power inlet of a motorized electric vehicle 1-00 such as a locomotive.

Figure 2:
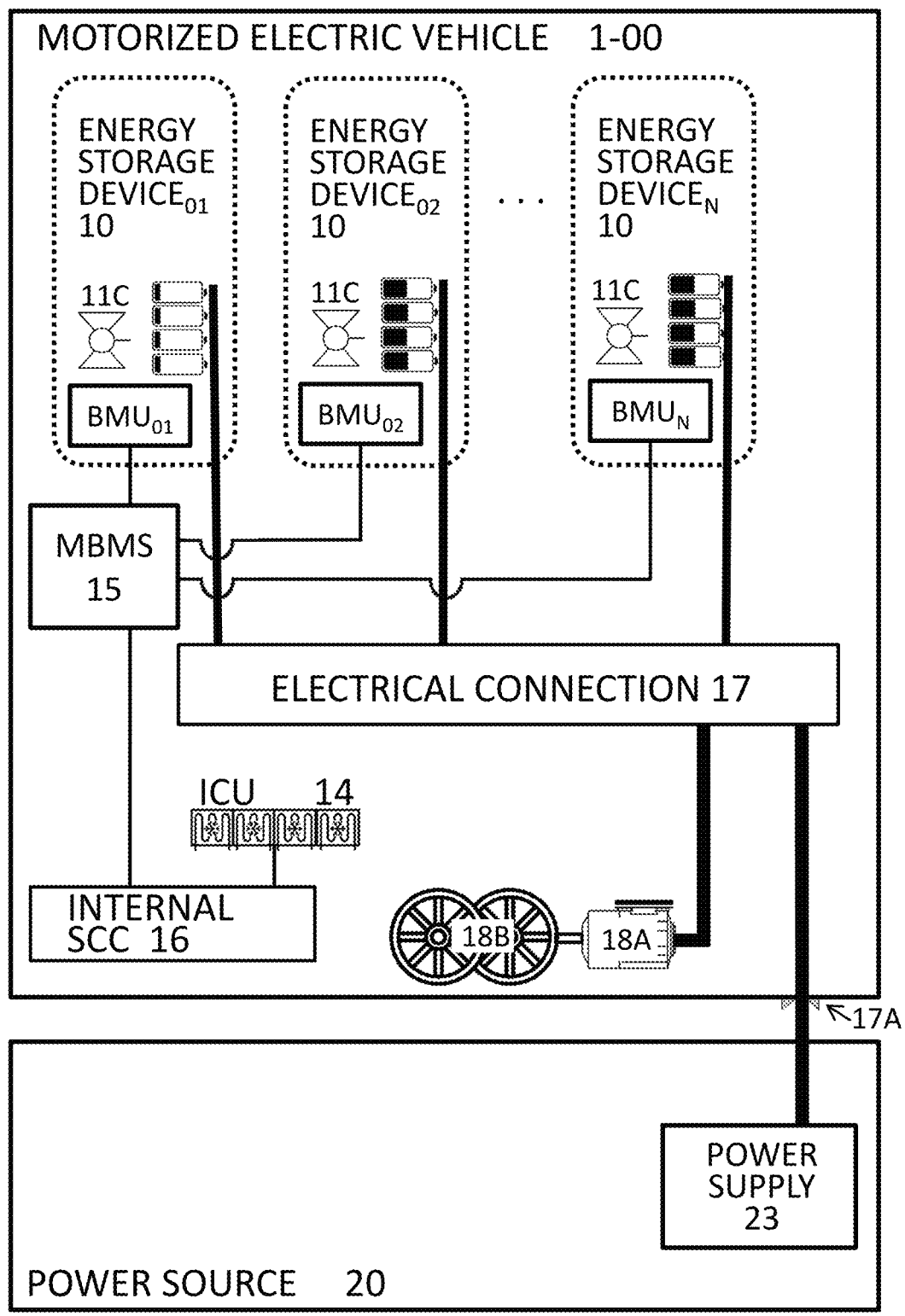
FIG. 2 is a block diagram representing the electrical and data communication connections of an internal cooling system housed in a motorized electric vehicle, in electrical connection to a power supply of a power source during a charging session, in an embodiment of the invention.

FIG. 2 is a block diagram representing the electrical and data communication connections of an internal cooling system housed in a motorized electric vehicle 1-00, in electrical connection to a power supply 23 of a power source 20 during a charging session, in an embodiment of the invention. FIG. 2 depicts three energy storage device 10 (01, 02 . . . N), each with its own BMU 13A ($BMU_{01}$, $BMU_{02}$ . . . $BMU_N$). The battery cells 13B of each energy storage device 10 are in electrical connection to the electrical connection 17. The BMUs 13A of each energy storage device 10 are in data communication with the MBMS 15. The MBMS 15 is in data communication with the internal SCC 16. The internal SCC 16 is in data communication with the internal cooling unit 14. The electrical connection 17 is in electrical connection with the at least one traction motor 18A which drives the wheels 18B of the motorized electric vehicle 1-00. The electrical connection 17 is in electrical connection to the power supply 23 of the power source 20 via the electrical connection connector 17A, such as during a charging session. Not illustrated, for simplicity of the figure, is the data communication pathways, either wired or wireless, between the internal SCC 16 and each of the HE flow controllers 11C.

Figure 3:
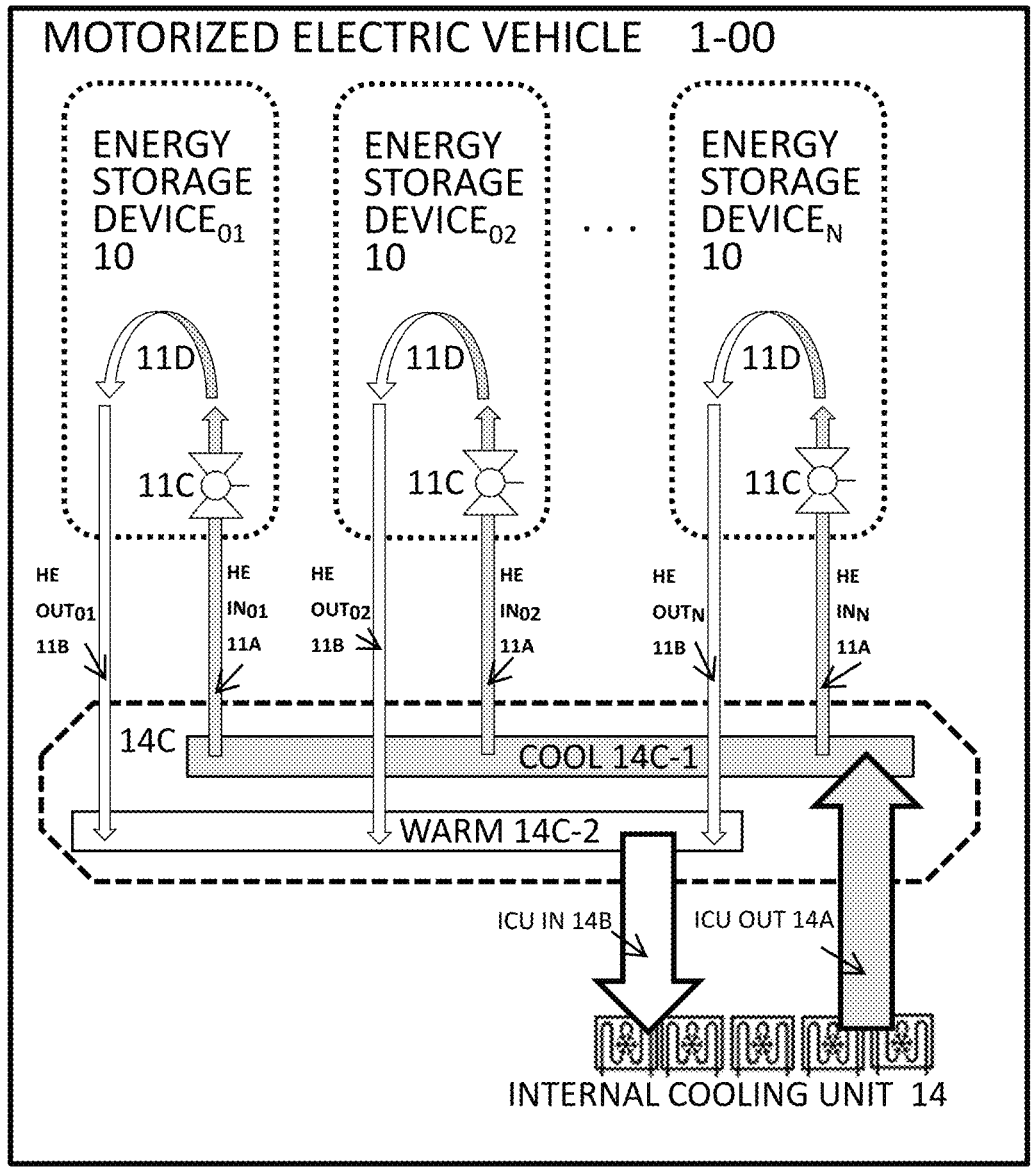
FIG. 3 is a block diagram representing fluid connection of components along the segmented coolant pathway of an internal cooling system housed in a motorized electric vehicle, in an embodiment of the invention.

FIG. 3 is a block diagram representing fluid connection of components along the segmented coolant pathway of an internal cooling system housed in a motorized electric vehicle 1-00, in an embodiment of the invention. For each energy storage device 10, the segmented coolant pathway exits from the internal cooling unit 14 via the ICU outlet 14A, through the cool trunk 14C-1 of the pair of coolant trunks 14C, through the HE inlet 11A of the energy storage device 10, through the HE passages 11D of the energy storage device 10, through the HE outlet 11B of the energy storage device 10, through the warm trunk 14C-2, and back into the internal cooling unit 14 via the ICU inlet 14B. The segmented coolant pathway passes through the HE flow controller 11C of the energy storage device 10. When coolant is pumped through each segmented coolant pathway, there is an HE flow rate through the HE flow controller 11C of the energy storage device 10, the HE flow controller 11C can regulate this HE flow rate. In this embodiment, there is no flow of coolant between the motorized electric vehicle 1-00 and the power source 20. The block diagram of FIG. 3 is also representative of the segmented coolant pathway of an internal cooling system housed in a power car. While illustrated in FIG. 3 as a flow valve, the HE flow controller 11C can be a flow valve, a variable speed drive (VSD) coolant pump, or a combination of the two. The HE flow controller 11C is directly or indirectly controlled by the internal SCC 22 to increase or decrease coolant flow through the segmented coolant pathways as needed. The HE flow controller 11C is in wired or wireless data communication with the internal SCC 22.

Figure 4:
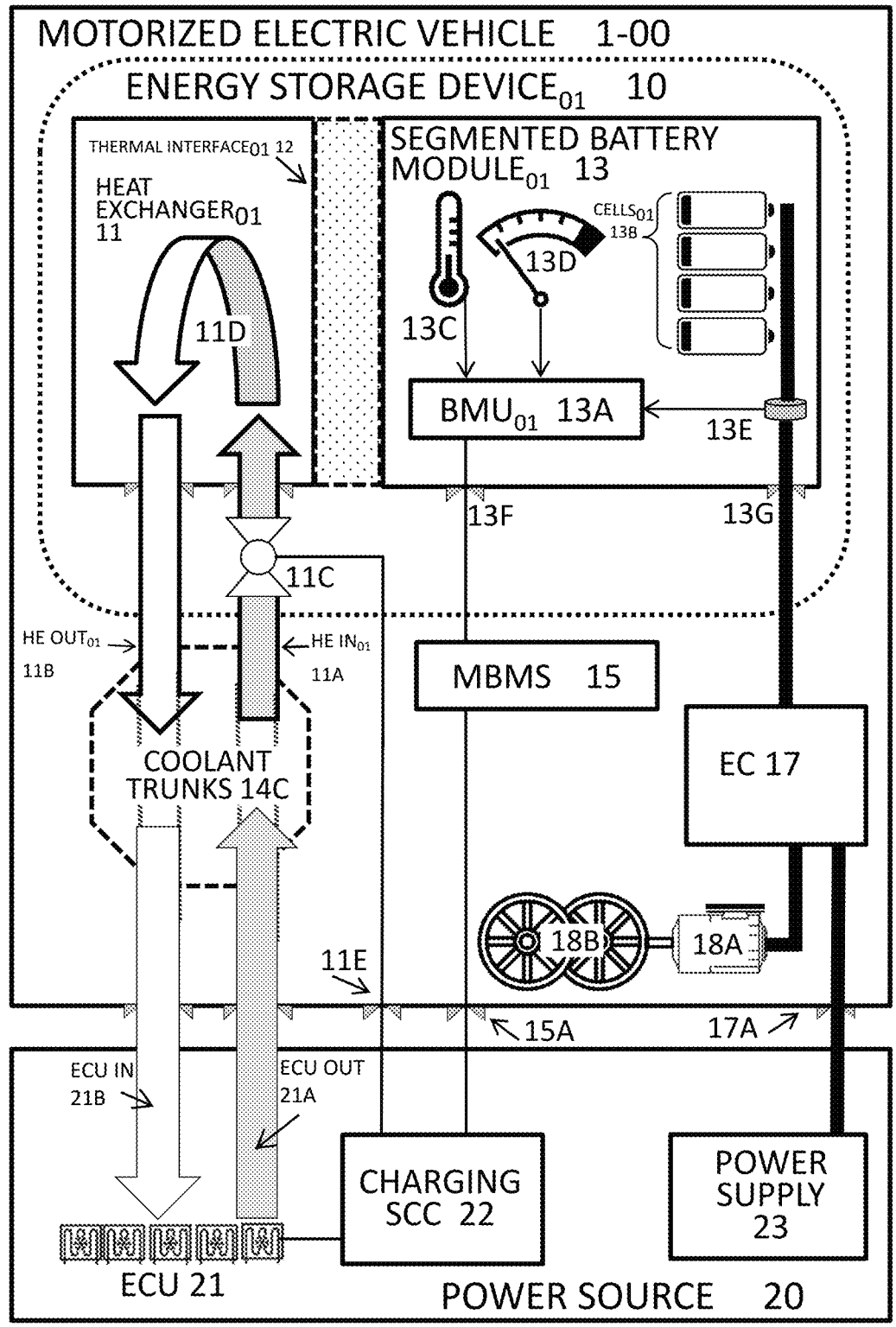
FIG. 4 is a block diagram representing an external cooling system split between a motorized electric vehicle and a power source, in an embodiment of the invention.

FIG. 4 is a block diagram representing an external cooling system split between a motorized electric vehicle 1-00 and a power source 20, in an embodiment of the invention. The motorized electric vehicle 1-00 includes a plurality of energy storage devices 10, a pair of coolant trunks 14C, a master battery management system (MBMS) 15, an electrical connection 17, and at least one traction motor 18A for driving wheels 18B. The power source 20 includes an external cooling unit 21, a charging segmented cooling controller (SCC) 22, and a power supply 23. The energy storage device 10 includes an optional thermal interface 12 between a heat exchanger 11 and a segmented battery module 13, typically used with water cooling. The heat exchanger 11 includes an HE inlet 11A, an HE outlet 11B, an HE flow controller 11C, and a plurality of HE passages 11D. While illustrated in FIG. 4 as a flow valve, the HE flow controller 11C can be a flow valve, a variable speed drive (VSD) coolant pump, or a combination of the two. The HE flow controller 11C is directly or indirectly controlled by the charging SCC 22 to increase or decrease coolant flow through the segmented coolant pathways as needed.

As illustrated in FIG. 4, the HE flow controller 11C is in wired or wireless data communication with the charging SCC 22 via an HE flow connector 11E. In alternative embodiments detailed in FIGS. 6B and 6C, control of the HE flow controller 11C could be dictated by either the charging SCC 22 mounted in the power source 20, an internal SCC 16 mounted inside the electric vehicle, or a combination of the two.

As illustrated in FIG. 4, the segmented battery module 13 includes: (i) a plurality of battery cells 13B in electrical connection to an electrical connection connector 17A; and (ii) a battery management unit (BMU) 13A in data communication with a temperature sensor 13C, a voltage sensor 13D, and a current sensor 13E. The charging SCC 22 includes a charging segmented cooling controller (SCC) 22 including a set of parameters. For simplicity in FIG. 4, just one energy storage device 10, 01 of N, and its components are depicted.

FIG. 4 illustrates a segmented coolant pathway for an external cooling system embodiment of the invention. For each energy storage device 10, the segmented coolant pathway exits from the external cooling unit 21 of the power source 20 via the ECU outlet 21A, through the cool trunk 14C-1 (not illustrated in FIG. 4, see FIG. 6A) of the pair of coolant trunks 14C, through the HE inlet 11A of the energy storage device 10, through the HE passages 11D of the energy storage device 10, through the HE outlet 11B of the energy storage device 10, through the warm trunk 14C-2 (not illustrated in FIG. 4, see FIG. 6A) of the pair of coolant trunks 14C, and back into the external cooling unit 21 of the power source 20 via the ECU inlet 21B. The segmented coolant pathway passes through the HE flow controller 11C of the energy storage device 10. When coolant is pumped through each segmented coolant pathway, there is an HE flow rate through the HE flow controller 11C of the energy storage device 10, the HE flow controller 11C can regulate this HE flow rate. In this embodiment, there is a flow of coolant between the motorized electric vehicle 1-00 and the power source 20.

FIG. 4 illustrates data communication connections from the sensors (13C, 13D, and 13E) to the BMU 13A, to the MBMS 15 wirelessly or by wire via the BMU connector 13F, to the charging SCC 22 via the MBMS connector 15A. The charging SCC 22 is also in data communication with the external cooling unit 21.

FIG. 4 illustrates electrical power connections between: (i) the battery cells 13B of each energy storage device 10 and the electrical connection 17 via the battery connector 13G of the energy storage device 10; (ii) the electrical connection 17 and the at least one traction motor 18A driving the wheels 18B; and (iii) the power supply 23 of the power source 20 and the electrical connection 17 via the electrical connection connector 17A.

Figure 5:
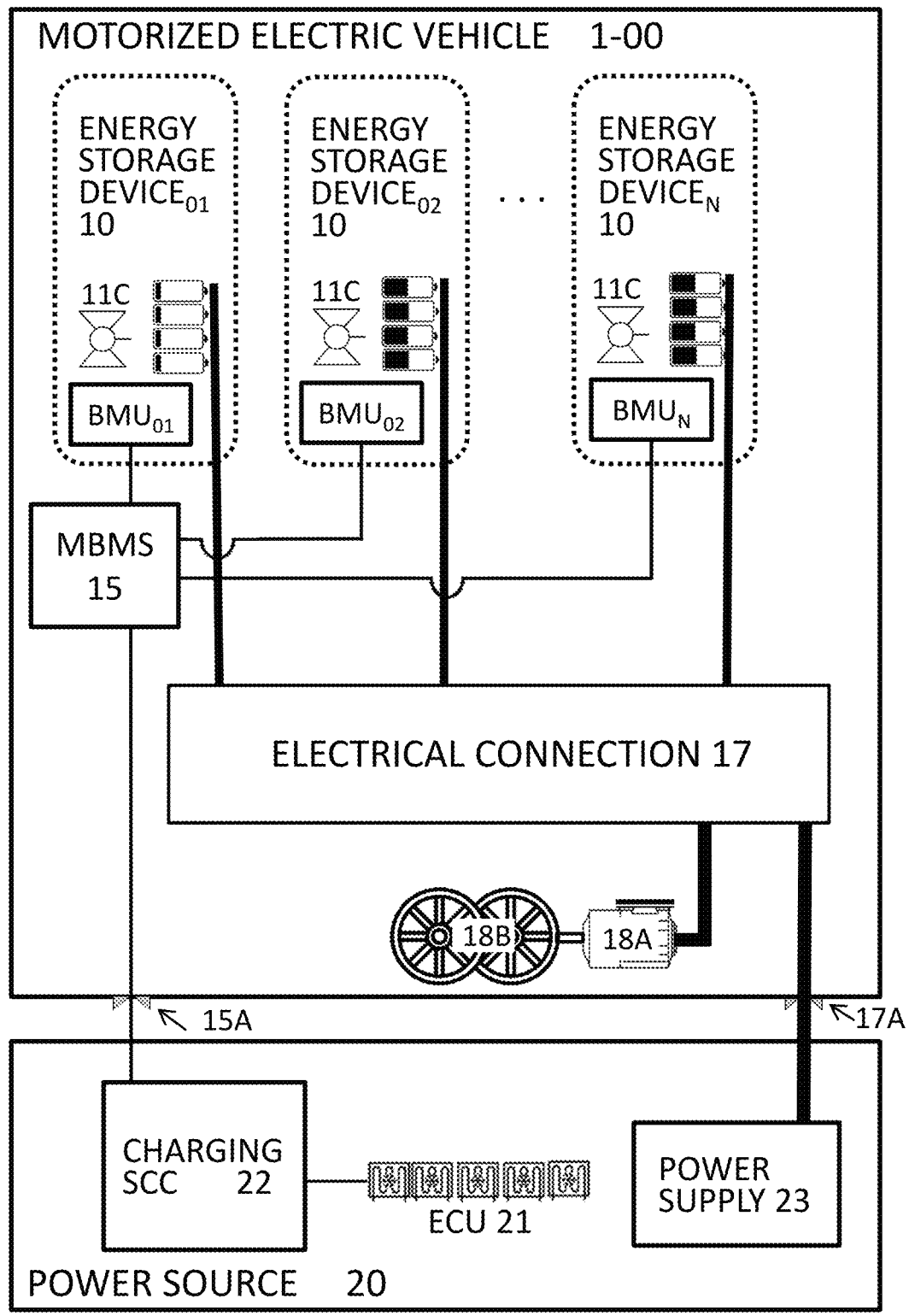
FIG. 5 is a block diagram representing the electrical and data communication connections of an external cooling system split between a motorized electric vehicle and a power source, in an embodiment of the invention.

FIG. 5 is a block diagram representing the electrical and data communication connections of an external cooling system split between a motorized electric vehicle 1-00 and a power source 20, in an embodiment of the invention. FIG. 5 depicts three energy storage device 10 (01, 02 ... N), each with its own BMU 13A (BMU$_{01}$, BMU$_{02}$ ... BMU$_N$). The battery cells 13B of each energy storage device 10 are in electrical connection to the electrical connection 17. The BMUs 13A of each energy storage device 10 are in data communication with the MBMS 15. The MBMS 15 is in data communication with the charging SCC 22. The charging SCC 22 is in data communication with the external cooling unit 21. The electrical connection 17 is in electrical connection with the at least one traction motor 18A which drives the wheels 18B of the motorized electric vehicle 1-00. The electrical connection 17 is in electrical connection to the power supply 23 of the power source 20 via the electrical connection connector 17A, such as during a charging session. Not illustrated, for simplicity of the figure, is the data communication pathways, either wired or wireless, between the charging SCC 22 (or any internal SCC 16 as in the embodiments of FIGS. 6B and 6C) and each of the HE flow controllers 11C.

Figure 6A:
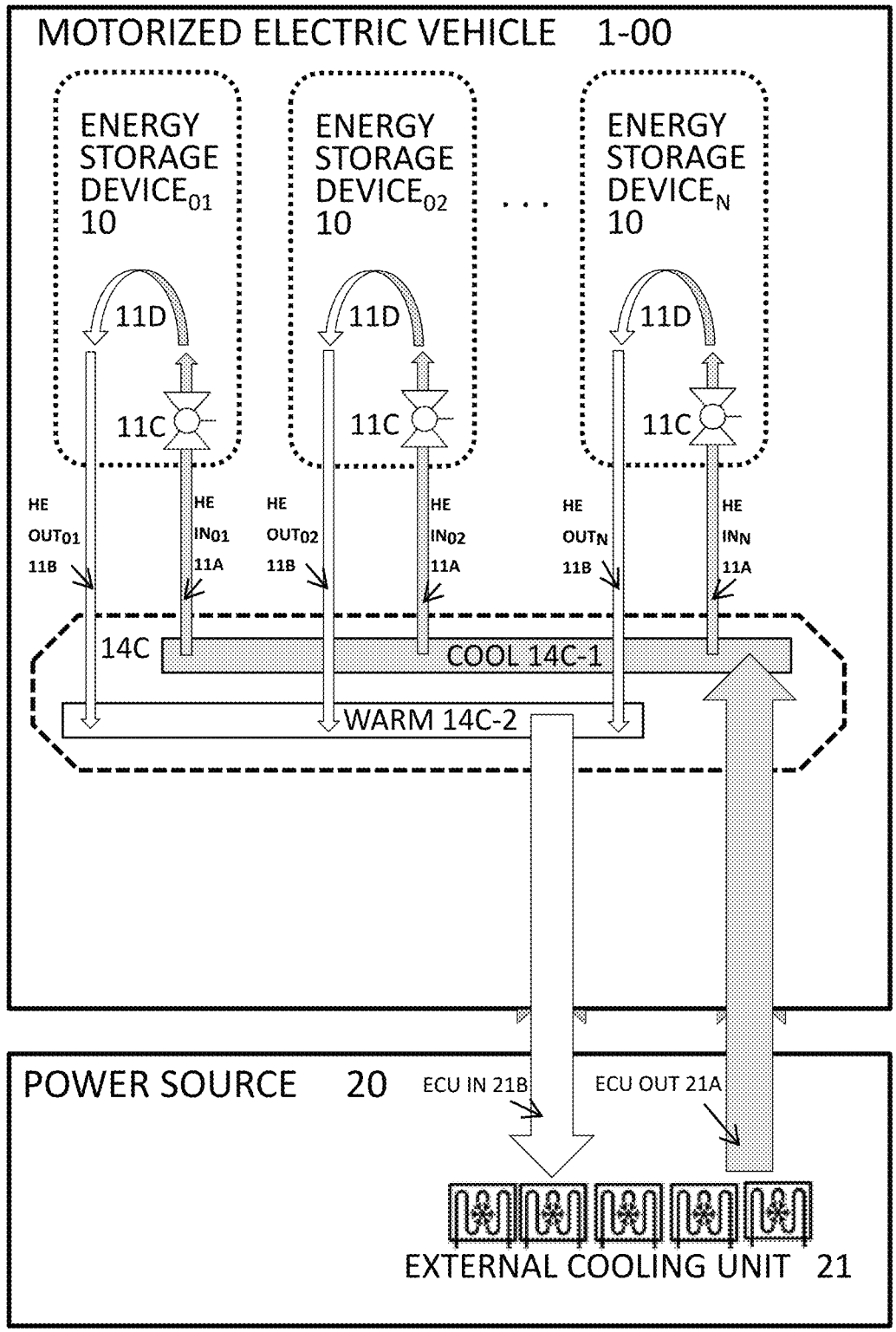
FIG. 6A is a block diagram representing fluid connection of components along the segmented coolant pathway passing through an external cooling unit, in an embodiment of the invention.

FIG. 6A is a block diagram representing fluid connection of components along the segmented coolant pathway of an external cooling system passing through an external cooling unit 21, in an embodiment of the invention. The segmented coolant pathway exits from the external cooling unit 21 via the ECU outlet 21A, through the cool trunk 14C-1 of the pair of coolant trunks 14C, through the HE inlet 11A of the energy storage device 10, through the HE passages 11D of the energy storage device 10, through the HE outlet 11B of the energy storage device 10, through the warm trunk 14C-2, and back into the external cooling unit 21 of the power source 20 via the ECU inlet 21B. The segmented coolant pathway passes through the HE flow controller 11C of the energy storage device 10. When coolant is pumped through each segmented coolant pathway, there is an HE flow rate through the HE flow controller 11C of the energy storage device 10, the HE flow controller 11C can regulate this HE flow rate. In this embodiment, there is a flow of coolant between the motorized electric vehicle 1-00 and the power source 20. The block diagram of FIG. 6A is also representative of the segmented coolant pathway of an external cooling system housed in a power car.

Figure 6B:
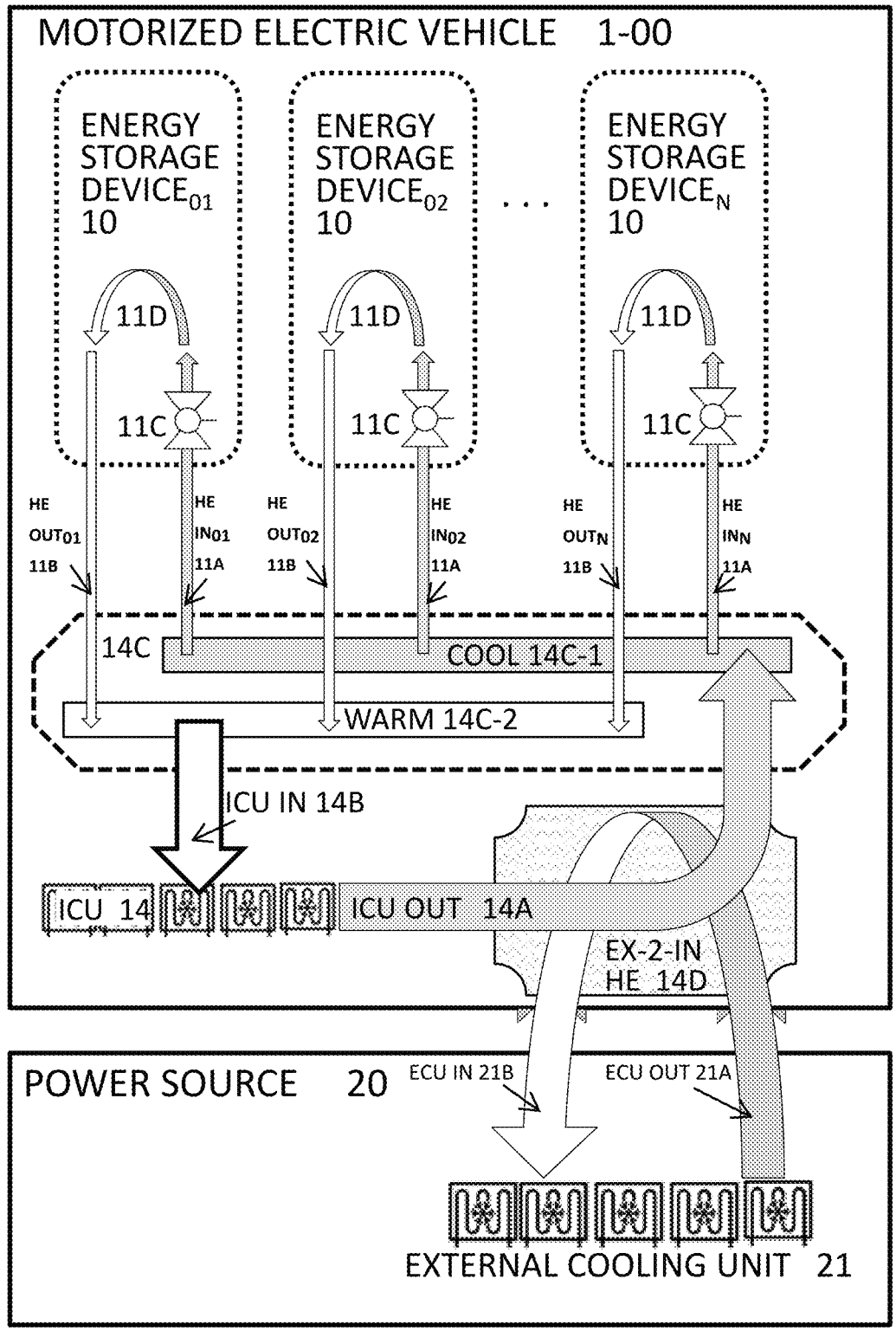
FIG. 6B is a block diagram representing fluid connection of components along the segmented coolant pathway passing through an internal cooling unit and an external-to-internal heat exchanger linked in thermal conductivity to an external cooling unit, in an embodiment of the invention.
Figure 6C:
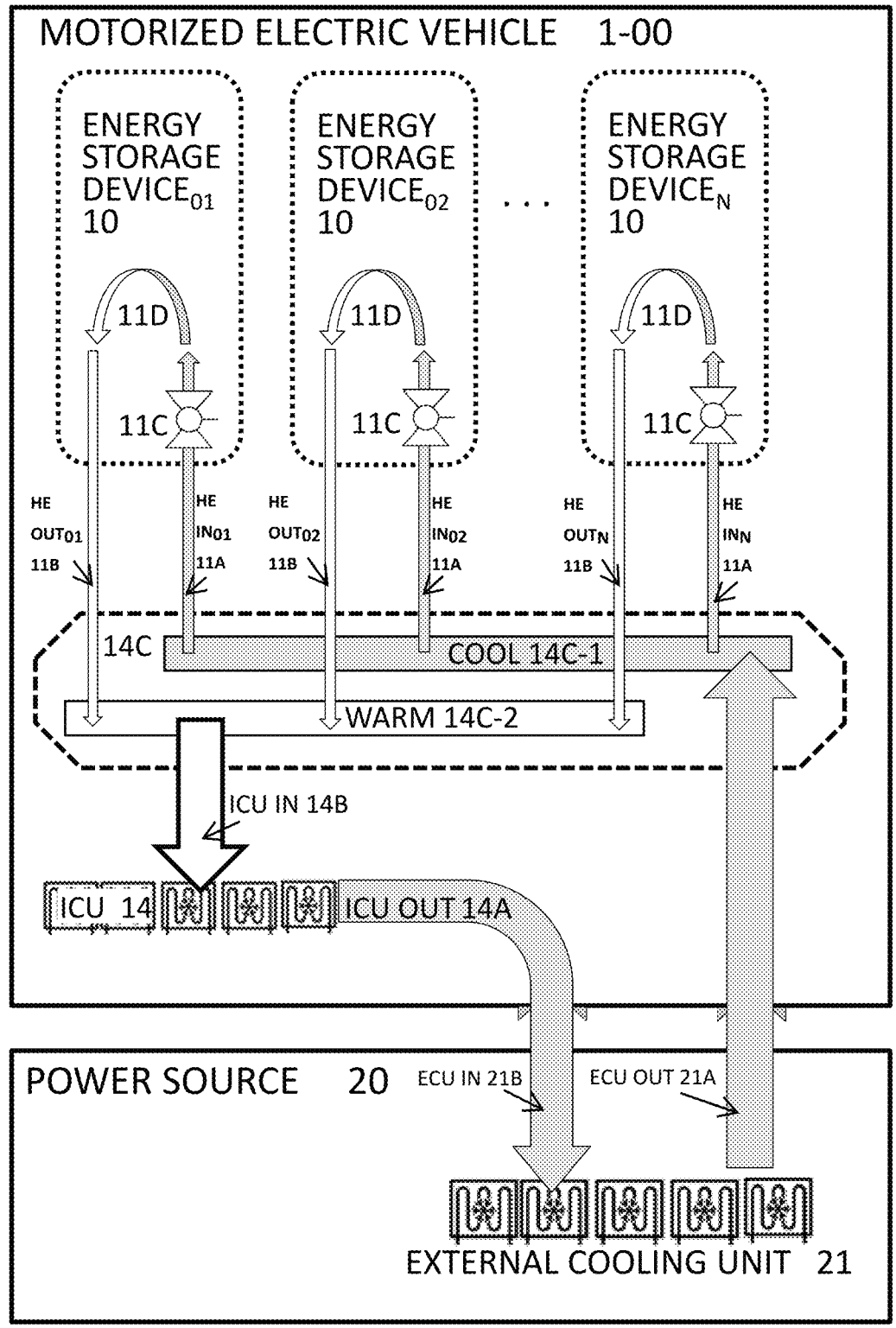
FIG. 6C is a block diagram representing fluid connection of components along the segmented coolant pathway passing through both an internal cooling unit and an external cooling unit, in an embodiment of the invention.

The FIG. 6A embodiment does not include an internal cooling unit 14. As illustrated in FIGS. 6B and 6C, discussed below, embodiments of the invention can optionally include an internal cooling unit 14 to cool the segmented battery modules 13 during motorized operation of the electric vehicle and/or during charging sessions.

FIG. 6B is a block diagram representing fluid connection of components along the segmented coolant pathway of an external cooling system passing through an internal cooling unit 14 and an external-to-internal heat exchanger 14D linked in thermal conductivity to an external cooling unit 21, in an embodiment of the invention. For each energy storage device 10, the segmented coolant pathway exits from the internal cooling unit 14 via the ICU outlet 14A, through the cool trunk 14C-1 of the pair of coolant trunks 14C, through the HE inlet 11A of the energy storage device 10, through the HE passages 11D of the energy storage device 10, through the HE outlet 11B of the energy storage device 10, through the warm trunk 14C-2, and back into the internal cooling unit 14 via the ICU inlet 14B. The segmented coolant pathway passes through the HE flow controller 11C of the energy storage device 10. When coolant is pumped through each segmented coolant pathway, there is an HE flow rate through the HE flow controller 11C of the energy storage device 10, the HE flow controller 11C can regulate this HE flow rate. In this embodiment, there is a flow of coolant between the motorized electric vehicle 1-00 and the power source 20. The block diagram of FIG. 6B is also representative of the segmented coolant pathway of an external cooling system housed in a power car.

As illustrated in FIG. 6B, the coolant in the segmented coolant pathway is additionally cooled in an external-to-internal heat exchanger 14D. The external-to-internal heat exchanger 14D received a second coolant pathway from an external cooling unit 21 in the power source 20. The second coolant pathway exits from the external cooling unit 21 via the ECU outlet 21A, passes through the external-to-internal heat exchanger 14D, and returns to the external cooling unit 21 via the ECU inlet 21B. The coolant of the segmented coolant pathway does not mix with the coolant of the second coolant pathway. This coolant separation enables use of different coolants between the electric vehicle's internal cooling unit 14 and the power source's external cooling unit 21. Such separation also avoids issues arising from use of polluted coolant, corrosive coolant, or unfiltered coolant.

FIG. 6C is a block diagram representing fluid connection of components along the segmented coolant pathway of an external cooling system passing through both an internal cooling unit 14 and an external cooling unit 21, in an embodiment of the invention. The segmented coolant pathway exits from the external cooling unit 21 via the ECU outlet 21A, through the cool trunk 14C-1 of the pair of coolant trunks 14C, through the HE inlet 11A of the energy storage device 10, through the HE passages 11D of the energy storage device 10, through the HE outlet 11B of the energy storage device 10, through the warm trunk 14C-2, into the internal cooling unit 14 via the ICU inlet 14B, out of the internal cooling unit 14 via the ICU outlet 14A, and back into the external cooling unit 21 of the power source 20 via the ECU inlet 21B. The segmented coolant pathway passes through the HE flow controller 11C of the energy storage device 10. When coolant is pumped through each segmented coolant pathway, there is an HE flow rate through the HE flow controller 11C of the energy storage device 10, the HE flow controller 11C can regulate this HE flow rate. In this embodiment, there is a flow of coolant between the motorized electric vehicle 1-00 and the power source 20. The block diagram of FIG. 6C is also representative of the segmented coolant pathway of an external cooling system housed in a power car.

While illustrated in FIGS. 6A, 6B, and 6C as a flow valve, the HE flow controller 11C can be a flow valve, a variable speed drive (VSD) coolant pump, or a combination of the two. As illustrated in these figures, the HE flow controller 11C is directly or indirectly controlled by the charging SCC 22 during the charging session to increase or decrease coolant flow through the segmented coolant pathways as needed. The HE flow controller 11C is in wired or wireless data communication with the charging SCC 22. Note that the charging SCC 22 (if housed in the electric vehicle) can be used to control the internal cooling unit 14 and HE flow controllers 11C to cool the segmented battery modules 13 during motorized operation of the electric vehicle; alternatively, an internal SCC 16 can be added to the electric vehicle to control the internal cooling unit 14 and HE flow controllers 11C to cool the segmented battery modules 13 during motorized operation of the electric vehicle.

Figure 7:
FIG. 7 is a flowchart of steps taken in a computer-implemented internal cooling method, in an embodiment of the invention.

FIG. 7 is a flowchart 7-00 of steps taken in a computer-implemented internal cooling method, in an embodiment of the invention. Steps 7-01 to 7-04 are listed below.

7-01 collect sensor information from the sensors of each energy storage device 10, the sensor information transmitted from each sensor to the BMU 13A of the energy storage device 10, to the MBMS wirelessly or by wire via the BMU connector 13F of the energy storage device 10, to the internal SCC 16

7-02 access the parameters for each energy storage device 10 from the set of parameters stored in the internal SCC 16

Figure 8:
FIG. 8 is a flowchart of steps taken in a computer-implemented external cooling method, in an embodiment of the invention.

7-03 employ the internal SCC 16 to calculate or recalculate the optimal range for the HE flow rate through the HE flow controller 11C of each energy storage device 10 employing either a thermal model for the energy storage device 10 and/or a control loop to maintain segmented battery module 13 of the energy storage device 10 within a preferred temperature range 7-04 adjust the HE flow rate through the HE flow controller 11C to within the optimal range, collect sensor information, and repeat calculations FIG. 8 is a flowchart of steps taken in a computer-implemented external cooling method, in an embodiment of the invention. Steps 8-01 to 8-09 are listed below.

8-01 park electric vehicle at power source 20 and connect: (1) ECU inlet 21B and ECU outlet 21A to coolant trunks 14C; (2) the charging SCC 22 to the MBMS via the MBMS connector 15A; and (3) the power supply 23 to electrical connection 17 via the electrical connection connector 17A 8-02 collect sensor information from sensors, transmit sensor information to the MBMS wirelessly or by wire via the BMU connector 13F, and receive sensor information at the charging SCC 22 via the MBMS connector 15A 8-03 access the parameters for each energy storage device 10 from the set of parameters stored in the charging SCC 22

8-04 commence charging session to charge the battery cells 13B of each energy storage device 10

8-05 calculate or recalculate the optimal range for the HE flow rate through the HE flow controller 11C employing either a thermal model or a control loop to maintain segmented battery module 13 within a preferred temperature range 8-06 adjust the HE flow rate through the HE flow controller 11C within the optimal range, collect sensor information, and repeat calculations until completion of charging session 8-07 end charging session 8-08 disconnect ECU inlet 21B and ECU outlet 21A from coolant trunks 14C, charging SCC 22 from MBMS connector 15A, and power supply 23 from electrical connection connector 17A 8-09 move electric vehicle out from power source 20, optionally cooling the segmented battery modules 13 during motorized operation of the electric vehicle using an internal cooling unit 14 as controlled by an internal SCC 16

In its most general form, the internal cooling system and method for segmented battery modules 13 within an electric vehicle provides individualized coolant flow to each of a plurality of energy storage devices 10 housed in an electric vehicle. Each energy storage device 10 includes a heat exchanger 11 coupled in thermal conductivity with a segmented battery module 13. The segmented battery module 13 includes battery cells 13B and sensors (13C, 13D, and 13E). The heat exchanger 11 includes an HE flow controller 11C. Individual sensor information for each energy storage device 10 is collected via the BMU 13A of each segmented battery module 13. The internal SCC 16 uses this individual sensor information to calculate the HE flow rate of coolant pumped through each energy storage device's 10 heat exchanger 11 to cool the battery cells 13B of the energy storage device 10. Coolant delivered to the heat exchangers 11 is cooled by an internal cooling unit 14 during each charging session, and can also be cooled by the internal cooling unit 14 during motorized operation of the electric vehicle.

A first embodiment of the internal cooling invention is an internal cooling system for a plurality of segmented battery modules 13. The system comprises: (a) a plurality of energy storage devices 10, each energy storage device 10 including a heat exchanger 11 and one of the segmented battery modules 13; (b) an electrical connection 17; (c) an internal cooling unit 14 with an ICU inlet 14B and an ICU outlet 14A; (d) a pair of coolant trunks 14C; and (e) an internal segmented cooling controller (SCC) 16 including a set of parameters. The heat exchanger 11 of each energy storage device 10 includes: (1) an HE flow controller 11C for controlling flow of coolant through the heat exchanger 11; (2) an HE inlet 11A for receiving the coolant into a plurality of HE passages 11D within the heat exchanger 11; and (3) an HE outlet 11B for discharging coolant from the HE passages 11D of the heat exchanger 11. The segmented battery module 13 of each energy storage device 10 includes: (1) a plurality of battery cells 13B in electrical connection with an electrical connection connector 17A; (2) a battery management module (BMU) 13A in data communication with a plurality of sensors, the sensors including at least one temperature sensor 13C located within the segmented battery module 13 and the BMU 13A configured to collect sensor information from the sensors; and (3) a BMU connector 13F in data communication with the BMU 13A. The electrical connection 17 is in electrical connection to the battery connector 13G of each of the energy storage devices 10. The electrical connection 17 is in electrical connection with one or more electrical connection connectors 17A. Each of the one or more electrical connection connectors 17A are connectable to one of one or more power supplies 23 of a power source 20 during a charging session for one or more of the energy storage devices 10. The pair of coolant trunks 14C includes: (1) a cool trunk 14C-1 with cooled coolant received from the internal cooling unit 14 via the ICU outlet 14A; and (2) a warm trunk 14C-2 with warmed coolant directed into the internal cooling unit 14 via the ICU inlet 14B. The cool trunk 14C-1 is in fluid connection with each of the HE inlets 11A of the energy storage devices 10. The warm trunk 14C-2 is in fluid connection with each of the HE outlets 11B of the energy storage devices 10. A segmented coolant pathway between the internal cooling unit 14 and each heat exchanger 11 is established for each energy storage device 10, the segmented coolant pathway exiting from the internal cooling unit 14 via the ICU outlet 14A, through the cool trunk 14C-1, through the HE inlet 11A of the energy storage device 10, through the HE passages 11D of the energy storage device 10, through the HE outlet 11B of the energy storage device 10, through the warm trunk 14C-2, and back into the internal cooling unit 14 via the ICU inlet 14B. The segmented coolant pathway passes through the HE flow controller 11C of the energy storage device 10. The segmented coolant pathway has an HE flow rate through the HE flow controller 11C of the energy storage device 10. The segmented coolant pathway established for each energy storage device 10 has an HE flow rate regulated by the HE flow controller 11C. The internal SCC 16 is in direct or indirect data communication with: (1) the internal cooling unit 14; (2) the HE flow controller 11C of each energy storage device 10; and (3) the BMU 13A of the segmented battery module 13 of each energy storage device 10 via the BMU connector 13F of the energy storage device 10. The internal SCC 16 is configured to directly or indirectly receive the sensor information collected by the BMU 13A of each energy storage device 10 wirelessly or by wire via the BMU connector 13F of the energy storage device 10, the sensor information includes at least temperature information measured by the at least one temperature sensor 13C located within the segmented battery module 13 of the energy storage device 10. The set of parameters include at least a preferred temperature range for the segmented battery module 13 of each energy storage device 10. The internal SCC 16 is configured to periodically: (1) calculate or recalculate an optimal range for the HE flow rate of the heat exchanger 11 of each energy storage device 10; and (2) control by wire or wirelessly the HE flow rate of each energy storage device 10, via the direct or indirect data communication with the HE flow controller 11C of the energy storage device 10, to maintain the HE flow rate within the optimal range. The optimal range is a function of: (a) the sensor information received by the internal SCC 16 from the sensors of the energy storage device 10 via the BMU 13A of the energy storage device 10; and (b) the preferred temperature range for the energy storage device 10.

In an alternative embodiment of the first embodiment of the internal cooling invention, the internal SCC 16 employs a control loop to: (a) adjust a power rating delivered to the internal cooling unit 14; (b) according to the temperature information from the temperature sensor 13C of the segmented battery module 13 of each of the energy storage devices 10, prioritize delivery of coolant to at least one of the energy storage devices 10; and (c) adjust the HE flow rate of coolant through one or more of the HE flow controllers 11C.

In an alternative embodiment of the first embodiment of the internal cooling invention, the plurality of sensors in the segmented battery module 13 of each energy storage device 10 further include a current sensor 13E configured to measure and transmit current information of the battery cells 13B of the segmented battery module 13 to the internal SCC 16 via the BMU 13A of the energy storage device 10. Also, the set of parameters includes a thermal model for each energy storage device 10. Further, the internal SCC 16 is further configured to calculate or recalculate for each energy storage device 10: (i) a heat generation estimate for the energy storage device 10 from the thermal model of the energy storage device 10, the current information for the energy storage device 10, and the preferred temperature range for the energy storage device 10; and (ii) the optimal range for the HE flow rate of the energy storage device 10 to counteract the heat generation estimate for the energy storage device 10.

In an alternative embodiment of the first embodiment of the internal cooling invention, the coolant is a fluid, water, a gas, or air.

In an alternative embodiment of the first embodiment of the internal cooling invention: (a) the system further includes a master battery management system (MBMS) 15; and (b) wired or wireless data communication between the internal SCC 16 and the BMU connector 13F of each energy storage device 10 is routed through the MBMS 15.

In an alternative embodiment of the first embodiment of the internal cooling invention: (a) the heat exchanger 11 and the segmented battery module 13 of each energy storage device 10 are paired in thermal conductivity via a thermal interface 12; (b) the heat exchanger 11 for each energy storage device 10 includes a heat sink conforming to at least one outer surface area of the segmented battery module 13 of the energy storage device 10; and (c) the thermal interface 12 between the heat sink and the segmented battery module 13 of each energy storage device 10 is a compressible thermally conductive material or a thermally conductive paste. The heat sink of each energy storage device 10 can comprise an aluminum shell enclosing the HE passages 11D of the energy storage device 10.

Conduction of heat from the battery cells 13B to the outer surface area of the segmented battery module 13 can be increased by use of heat conducting frame components within the segmented battery module 13. Use of multiple heat sinks is also beneficial, such as a first heat sink on a top surface of the segmented battery module 13 and a second heat sink on the bottom surface of the segmented battery module 13. Use of a compressible thermally conductive material or a thermally conductive paste is beneficial because air gaps between the segmented battery module 13 and the heat sink act as a heat insulation layer. It is useful to have many HE passages 11D within the heat sink to cool a wider surface area of the segmented battery module 13.

In an alternative embodiment of the first embodiment of the internal cooling invention, the system is housed in an electric vehicle. The electric vehicle can be a motorized electric vehicle 1-00 or a power car. If a motorized electric vehicle 1-00, the motorized vehicle includes a vehicle control system and at least one traction motor 18A in electrical connection with the electrical connection 17, wherein operation of the at least one traction motor 18A is controlled by the vehicle control system and the internal SCC 16 is in data communication with the vehicle control system. In a motorized vehicle, the internal SCC 16 can be configured to download or link to either: (i) an itinerary map detailing at least one of a speed map, an incline grade map, a travel distance, and a travel time; or (ii) a vehicle dashboard detailing at least one of a present speed of the motorized electric vehicle 1-00, a present electrical current load of the at least one traction motor 18A of the motorized electric vehicle 1-00, and a present incline of the motorized electric vehicle 1-00. If the electric vehicle is a power car, then: (a) the power car includes one or more power outlets in electrical connection to the electrical connection 17 of the system; and (b) the one or more power outlets are connectable to one or more power inlets of a motorized electric vehicle 1-00.

A second embodiment of the internal cooling invention is a computer-implemented internal cooling method for a plurality of segmented battery modules 13. The method comprises: (a) maintaining a plurality of energy storage devices 10, each energy storage device 10 including a heat exchanger 11 and one of the segmented battery modules 13; (b) maintaining an electrical connection 17; (c) maintaining an internal cooling unit 14 with an ICU inlet 14B and an ICU outlet 14A; (d) maintaining a pair of coolant trunks 14C; (e) maintaining an internal segmented cooling controller (SCC) 16 including a set of parameters; (f) periodically employing the internal SCC 16 to calculate or recalculate an optimal range for the HE flow rate of the heat exchanger 11 of each energy storage device 10; and (g) controlling by wire or wirelessly the HE flow rate of each energy storage device 10, via the direct or indirect data communication with the HE flow controller 11C of the energy storage device 10, to maintain the HE flow rate within the optimal range. The heat exchanger 11 of each energy storage device 10 includes: (1) an HE flow controller 11C for controlling flow of coolant through the heat exchanger 11; (2) an HE inlet 11A for receiving the coolant into a plurality of HE passages 11D within the heat exchanger 11; and (3) an HE outlet 11B for discharging coolant from the HE passages 11D of the heat exchanger 11. The segmented battery module 13 of each energy storage device 10 includes: (1) a plurality of battery cells 13B in electrical connection with an electrical connection connector 17A; (2) a battery management module (BMU) 13A in data communication with a plurality of sensors, the sensors including at least one temperature sensor 13C located within the segmented battery module 13 and the BMU 13A configured to collect sensor information from the sensors; and (3) a BMU connector 13F in data communication with the BMU 13A. The electrical connection 17 is in electrical connection to the battery connector 13G of each of the energy storage devices 10. The electrical connection 17 is in electrical connection with one or more electrical connection connectors 17A. Each of the one or more electrical connection connectors 17A are connectable to one of one or more power supplies 23 of a power source 20 during a charging session for one or more of the energy storage devices 10. The pair of coolant trunks 14C includes: (1) a cool trunk 14C-1 with cooled coolant received from the internal cooling unit 14 via the ICU outlet 14A; and (2) a warm trunk 14C-2 with warmed coolant directed into the internal cooling unit 14 via the ICU inlet 14B. The cool trunk 14C-1 is in fluid connection with each of the HE inlets 11A of the energy storage devices 10. The warm trunk 14C-2 is in fluid connection with each of the HE outlets 11B of the energy storage devices 10. A segmented coolant pathway between the internal cooling unit 14 and each heat exchanger 11 is established for each energy storage device 10, the segmented coolant pathway exiting from the internal cooling unit 14 via the ICU outlet 14A, through the cool trunk 14C-1, through the HE inlet 11A of the energy storage device 10, through the HE passages 11D of the energy storage device 10, through the HE outlet 11B of the energy storage device 10, through the warm trunk 14C-2, and back into the internal cooling unit 14 via the ICU inlet 14B. The segmented coolant pathway passing through the HE flow controller 11C of the energy storage device 10. The segmented coolant pathway having an HE flow rate through the HE flow controller 11C of the energy storage device 10. The segmented coolant pathway established for each energy storage device 10 has an HE flow rate regulated by the HE flow controller 11C. The internal SCC 16 is in direct or indirect data communication with: (1) the internal cooling unit 14; (2) the HE flow controller 11C of each energy storage device 10; and (3) the BMU 13A of the segmented battery module 13 of each energy storage device 10 via the BMU connector 13F of the energy storage device 10. The internal SCC 16 is configured to directly or indirectly receive the sensor information collected by the BMU 13A of each energy storage device 10 wirelessly or by wire via the BMU connector 13F of the energy storage device 10, the sensor information including at least temperature information measured by the at least one temperature sensor 13C located within the segmented battery module 13 of the energy storage device 10. The set of parameters include at least a preferred temperature range for the segmented battery module 13 of each energy storage. The optimal range is a function of: (i) the sensor information received by the internal SCC 16 from the sensors of the energy storage device 10 via the BMU 13A of the energy storage device 10; and (ii) the preferred temperature range for the energy storage device 10.

In an alternative embodiment of the second embodiment of the internal cooling invention, the internal SCC 16 employs a control loop to: (a) adjust a power rating delivered to the internal cooling unit 14; (b) according to the temperature information from the temperature sensor 13C of the segmented battery module 13 of each of the energy storage devices 10, prioritize delivery of coolant to at least one of the energy storage devices 10; and (c) adjust the HE flow rate of coolant through one or more of the HE flow controllers 11C.

In an alternative embodiment of the second embodiment of the internal cooling invention, the plurality of sensors in the segmented battery module 13 of each energy storage device 10 further include a current sensor 13E configured to measure and transmit current information of the battery cells 13B of the segmented battery module 13 to the internal SCC 16 via the BMU 13A of the energy storage device 10. Also, the set of parameters includes a thermal model for each energy storage device 10. Further, the step of periodically employing the internal SCC 16 to calculate or recalculate the optimal range includes calculating or recalculating for each energy storage device 10: (i) a heat generation estimate for the energy storage device 10 from the thermal model of the energy storage device 10, the current information for the energy storage device 10, and the preferred temperature range for the energy storage device 10; and (ii) the optimal range for the HE flow rate of the energy storage device 10 to counteract the heat generation estimate for the energy storage device 10.

In an alternative embodiment of the second embodiment of the internal cooling invention, the coolant is a fluid, water, a gas, or air.

In an alternative embodiment of the second embodiment of the internal cooling invention: (a) the system further includes a master battery management system (MBMS) 15; and (b) wired or wireless data communication between the internal SCC 16 and the BMU connector 13F of each energy storage device 10 is routed through the MBMS 15.

In an alternative embodiment of the second embodiment of the internal cooling invention: (a) the heat exchanger 11 for each energy storage device 10 includes a heat sink conforming to at least one outer surface area of the segmented battery module 13 of the energy storage device 10; and (b) the thermal interface 12 between the heat sink and the segmented battery module 13 of each energy storage device 10 is a compressible thermally conductive material or a thermally conductive paste. The heat sink of each energy storage device 10 can comprise an aluminum shell enclosing the HE passages 11D of the energy storage device 10.

In an alternative embodiment of the second embodiment of the internal cooling invention, the method is implemented by an electric vehicle. The electric vehicle can be a motorized electric vehicle 1-00 or a power car. If a motorized electric vehicle 1-00: (a) the motorized electric vehicle 1-00 includes a vehicle control system and at least one traction motor 18A in electrical connection with the electrical connection 17; (b) operation of the at least one traction motor 18A is controlled by the vehicle control system; and (c) the internal SCC 16 is in data communication with the vehicle control system. The internal SCC 16 is configured to download or link to at least one of: (i) an itinerary map detailing at least one of a speed map, an incline grade map, a travel distance, and a travel time; and (ii) a vehicle dashboard detailing at least one of a present speed of the motorized electric vehicle 1-00, a present electrical current load of the at least one traction motor 18A of the motorized electric vehicle 1-00, and a present incline of the motorized electric vehicle 1-00.

In an alternative embodiment of the second embodiment of the internal cooling invention: (a) the electric vehicle is a power car including one or more power outlets in electrical connection to the electrical connection 17 of the system; and (b) the one or more power outlets are connectable to one or more power inlets of a motorized electric vehicle 1-00.

In its most general form, the external cooling system and method for segmented battery modules 13 within an electric vehicle provides individualized coolant flow to each of a plurality of energy storage devices 10 housed in an electric vehicle. Each energy storage device 10 includes a heat exchanger 11 coupled in thermal conductivity with a segmented battery module 13. The segmented battery module 13 includes battery cells 13B and sensors (13C, 13D, and 13E). The heat exchanger 11 includes an HE flow controller 11C. Individual sensor information for each energy storage device 10 is collected via the BMU 13A of each segmented battery module 13. The charging SCC 22 uses this individual sensor information to calculate the HE flow rate of coolant pumped through each energy storage device's 10 heat exchanger 11 to cool the battery cells 13B of the energy storage device 10. Coolant delivered to the heat exchangers 11 is cooled by an external cooling unit 21 of a power source 20 during each charging session.

An external cooling system and method for segmented battery modules 13 mounted within an electric vehicle is a system and method enabling individualized coolant flow to each of a plurality of energy storage devices 10 housed in an electric vehicle. Each energy storage device 10 includes a heat exchanger 11 coupled in thermal conductivity with a segmented battery module 13. The segmented battery module 13 includes battery cells 13B and sensors (13C, 13D, and 13E). The heat exchanger 11 includes an HE flow controller 11C. Individual sensor information for each energy storage device 10 is collected via the BMU 13A of each segmented battery module 13. The charging SCC 22 uses this individual sensor information to calculate the HE flow rate of coolant pumped through each energy storage device's 10 heat exchanger 11 to cool the battery cells 13B of the energy storage device 10. Coolant delivered to the heat exchangers 11 is cooled by an external cooling unit 21 of a power source 20 during each charging session.

A first embodiment of the external cooling invention is an external cooling system for a plurality of segmented battery modules 13. The system comprises an electric vehicle paired with a power source 20: (a) a plurality of energy storage devices 10 housed in the electric vehicle, each energy storage device 10 including a heat exchanger 11 and one of the segmented battery modules 13; (b) an electrical connection 17 housed in the electric vehicle; (c) a master battery management system (MBMS) 15 housed in the electric vehicle; (d) an external cooling unit 21 housed in the power source 20, the external cooling unit 21 including an ECU inlet 21B and an ECU outlet 21A; (e) a pair of coolant trunks 14C housed in the electric vehicle; and (f) a charging segmented cooling controller (SCC) 22, the charging SCC 22 including a set of parameters. The heat exchanger 11 of each energy storage device 10 includes: (1) an HE flow controller 11C for controlling flow of coolant through the heat exchanger 11; (2) an HE inlet 11A for receiving the coolant into a plurality of HE passages 11D within the heat exchanger 11; and (3) an HE outlet 11B for discharging coolant from the HE passages 11D of the heat exchanger 11. The segmented battery module 13 of each energy storage device 10 includes: (1) a plurality of battery cells 13B in electrical connection with an electrical connection connector 17A; (2) a battery management module (BMU) 13A in data communication with a plurality of sensors, the sensors including at least one temperature sensor 13C located within the segmented battery module 13 and the BMU 13A configured to collect sensor information from the sensors; and (3) a BMU connector 13F in data communication with the BMU 13A. The electrical connection 17 is in electrical connection to the battery connector 13G of each of the energy storage devices 10. The electrical connection 17 is in electrical connection with one or more electrical connection connectors 17A. Each of the one or more electrical connection connectors 17A are connectable to one of one or more power supplies 23 of the power source 20 during each of a plurality of charging sessions for one or more of the energy storage devices 10 during each charging session. The MBMS 15 is in data communication with the BMU 13A of each energy storage device 10 wirelessly or by wire via the BMU connector 13F of the energy storage device 10. The pair of coolant trunks 14C includes: (1) a cool trunk 14C-1 for receiving cooled coolant; and (2) a warm trunk 14C-2 for discharging warmed coolant. The cool trunk 14C-1 is in fluid connection with each of the HE inlets 11A of the energy storage devices. The warm trunk 14C-2 is in fluid connection with each of the HE outlets 11B of the energy storage devices. A segmented coolant pathway between the external cooling unit 21 and each heat exchanger 11 is established for each energy storage device 10. The segmented coolant pathway passes through the HE flow controller 11C of the energy storage device 10. The segmented coolant pathway has an HE flow rate through the HE flow controller 11C of the energy storage device 10. The segmented coolant pathway established for each energy storage device 10 has an HE flow rate regulated by the HE flow controller 11C. During each charging session the charging SCC 22 is in direct or indirect data communication by wire or wirelessly with: (1) the external cooling unit 21; (2) the HE flow controller 11C of each energy storage device 10; (3) the MBMS 15; and (4) the BMU 13A of the segmented battery module 13 of each energy storage device 10 via the MBMS 15 and the BMU connector 13F of the energy storage device 10. During each charging session the charging SCC 22 is configured to directly or indirectly receive the sensor information collected by the BMU 13A of each energy storage device 10 wirelessly or by wire via the BMU connector 13F of the energy storage device 10, the sensor information including at least temperature information measured by the at least one temperature sensor 13C located within the segmented battery module 13 of the energy storage device 10. The set of parameters include at least a preferred temperature range for the segmented battery module 13 of each energy storage device 10. During each charging session the charging SCC 22 is configured to periodically: (1) calculate or recalculate an optimal range for the HE flow rate of the heat exchanger 11 of each energy storage device 10; and (2) control by wire or wirelessly the HE flow rate of each energy storage device 10, via the direct or indirect data communication with the HE flow controller 11C of the energy storage device 10, to maintain the HE flow rate within the optimal range. The optimal range is a function of: (a) the sensor information received by the charging SCC 22 from the sensors of the energy storage device 10 via the BMU 13A of the energy storage device 10; and (b) the preferred temperature range for the energy storage device 10.

In an alternative embodiment of the first embodiment of the external cooling invention, the charging SCC 22 is housed in the electric vehicle or, alternatively, in the power source 20.

In an alternative embodiment of the first embodiment of the external cooling invention: (a) the cool trunk 14C-1 receives cooled coolant from the external cooling unit 21 via the ECU outlet 21A; (b) the warm trunk 14C-2 discharges warmed coolant into the external cooling unit 21 via the ECU inlet 21B; and (c) wherein the segmented coolant pathway for each energy storage device 10 exits from the external cooling unit 21 via the ECU outlet 21A, through the cool trunk 14C-1, through the HE inlet 11A of the energy storage device 10, through the HE passages 11D of the energy storage device 10, through the HE outlet 11B of the energy storage device 10, through the warm trunk 14C-2, and back into the external cooling unit 21 via the ECU inlet 21B.

In an alternative embodiment of the first embodiment of the external cooling invention, the system further comprises an external-to-internal heat exchanger 14D and an internal cooling unit 14. The internal cooling unit 14 includes an ICU inlet 14B and an ICU outlet 14A. The cool trunk 14C-1 receives cooled coolant from the internal cooling unit 14 via the ICU outlet 14A after the coolant passes through the external-to-internal heat exchanger 14D. The warm trunk 14C-2 discharges warmed coolant into the internal cooling unit 14 via the ICU inlet 14B. The segmented coolant pathway for each energy storage device 10 exits from the internal cooling unit 14 via the ICU outlet 14A, through the external-to-internal heat exchanger 14D, through the cool trunk 14C-1 of the pair of coolant trunks 14C, through the HE inlet 11A of the energy storage device 10, through the HE passages 11D of the energy storage device 10, through the HE outlet 11B of the energy storage device 10, through the warm trunk 14C-2, and back into the internal cooling unit 14 via the ICU inlet 14B. A second coolant pathway exits from the external cooling unit 21 via the ECU outlet 21A, passes through the external-to-internal heat exchanger 14D, and returns to the external cooling unit 21 via the ECU inlet 21B. This embodiment can optionally be configured such that: (a) the charging SCC 22 is housed in the electric vehicle; (b) the internal cooling unit 14 is in data communication with the charging SCC 22; and (c) the charging SCC 22 is configured to control coolant flow through each of the energy storage devices 10 during motorized operation of the electric vehicle. This embodiment can alternatively optionally be configured such that: (a) the system further comprises an internal segmented coolant controller (SCC) 16 housed in the electric vehicle; (b) the charging SCC 22 is housed in the power source 20; (c) the internal cooling unit 14 is in data communication with the internal SCC 16; and (d) the internal SCC 16 is configured to control coolant flow through each of the energy storage devices 10 during motorized operation of the electric vehicle.

In an alternative embodiment of the first embodiment of the external cooling invention, the system further comprises an internal cooling unit 14. The cool trunk 14C-1 receives cooled coolant from the external cooling unit 21 via the ECU outlet 21A. The warm trunk 14C-2 discharges warmed coolant into the internal cooling unit 14 via the ICU inlet 14B. The segmented coolant pathway for each energy storage device 10 exits from the external cooling unit 21 via the ECU outlet 21A, through the cool trunk 14C-1, through the HE inlet 11A of the energy storage device 10, through the HE passages 11D of the energy storage device 10, through the HE outlet 11B of the energy storage device 10, through the warm trunk 14C-2, into the internal cooling unit 14 via the ICU inlet 14B, out of the internal cooling unit 14 via the ICU outlet 14A, and back into the external cooling unit 21 via the ECU inlet 21B. This embodiment can optionally be configured such that: (a) the charging SCC 22 is housed in the electric vehicle; (b) the internal cooling unit 14 is in data communication with the charging SCC 22; and (c) the charging SCC 22 is configured to control coolant flow through each of the energy storage devices 10 during motorized operation of the electric vehicle. This embodiment can alternatively optionally be configured such that: (a) the system further comprises an internal segmented coolant controller (SCC) housed in the electric vehicle; (b) the charging SCC 22 is housed in the power source 20; (c) the internal cooling unit 14 is in data communication with the internal SCC 16; and (d) the internal SCC 16 is configured to control coolant flow through each of the energy storage devices 10 during motorized operation of the electric vehicle.

In an alternative embodiment of the first embodiment of the external cooling invention, the charging SCC employs a control loop to: (a) adjust a power rating delivered to the external cooling unit 21; (b) according to the temperature information from the temperature sensor 13C of the segmented battery module 13 of each of the energy storage devices 10, prioritize delivery of coolant to at least one of the energy storage devices 10; and (c) adjust the HE flow rate of coolant through one or more of the HE flow controllers 11C.

In an alternative embodiment of the first embodiment of the external cooling invention, the plurality of sensors in the segmented battery module 13 of each energy storage device 10 further include a current sensor 13E configured to measure and transmit current information of the battery cells 13B of the segmented battery module 13 to the charging SCC via the BMU 13A of the energy storage device 10. The set of parameters includes a thermal model for each energy storage device 10. The calculation or recalculation by the charging SCC of the optimal range for each energy storage device 10 includes calculation or recalculation of: (i) a heat generation estimate for the energy storage device 10 from the thermal model of the energy storage device 10, the current information for the energy storage device 10, and the preferred temperature range for the energy storage device 10; and (ii) the optimal range for the HE flow rate of the energy storage device 10 to counteract the heat generation estimate for the energy storage device 10.

In an alternative embodiment of the first embodiment of the external cooling invention, the coolant is a fluid, water, a gas, or air.

In an alternative embodiment of the first embodiment of the external cooling invention: (a) the heat exchanger 11 and the segmented battery module 13 of each energy storage device 10 are paired in thermal conductivity via a thermal interface 12; (b) the heat exchanger 11 for each energy storage device 10 includes a heat sink conforming to at least one outer surface area of the segmented battery module 13 of the energy storage device 10; and (c) the thermal interface 12 between the heat sink and the segmented battery module 13 of each energy storage device 10 is a compressible thermally conductive material or a thermally conductive paste. The heat sink of each energy storage device 10 can comprise an aluminum shell enclosing the HE passages 11D of the energy storage device 10.

In an alternative embodiment of the first embodiment of the external cooling invention: (a) the electric vehicle is a motorized electric vehicle 1-00 including a vehicle control system and at least one traction motor 18A in electrical connection with the electrical connection 17; and (b) operation of the at least one traction motor 18A is controlled by the vehicle control system.

In an alternative embodiment of the first embodiment of the external cooling invention: (a) the electric vehicle is a power car including one or more power outlets in electrical connection to the electrical connection 17; and (b) the one or more power outlets are connectable to one or more power inlets of a motorized electric vehicle 1-00.

A second embodiment of the external cooling invention is a computer-implemented external cooling method for a plurality of segmented battery modules 13. The method comprises: (a) maintaining a plurality of energy storage devices 10 in an electric vehicle, each energy storage device 10 including a heat exchanger 11 and one of the segmented battery modules 13; (b) maintaining an electrical connection 17 in the electric vehicle; (c) maintaining a master battery management system (MBMS) 15 in the electric vehicle; (d) maintaining an external cooling unit 21 in a power source 20, the external cooling unit 21 including an ECU inlet 21B and an ECU outlet 21A; (e) maintaining a pair of coolant trunks 14C in the electric vehicle; (f) maintaining a charging segmented cooling controller (SCC) 22, the charging SCC 22 including a set of parameters; (g) commencing the charging session for one or more energy storage devices 10; (h) during the charging session, periodically employing the charging SCC 22 to calculate or recalculate an optimal range for the HE flow rate of the heat exchanger 11 of each energy storage device 10; and (i) during the charging session, controlling by wire or wirelessly the HE flow rate of each energy storage device 10, via the direct or indirect data communication with the HE flow controller 11C of the energy storage device 10, to maintain the HE flow rate within the optimal range. The heat exchanger 11 of each energy storage device 10 includes: (1) an HE flow controller 11C for controlling flow of coolant through the heat exchanger 11; (2) an HE inlet 11A for receiving the coolant into a plurality of HE passages 11D within the heat exchanger 11; and (3) an HE outlet 11B for discharging coolant from the HE passages 11D of the heat exchanger 11. The segmented battery module 13 of each energy storage device 10 includes: (1) a plurality of battery cells 13B in electrical connection with an electrical connection connector 17A; (2) a battery management module (BMU) 13A in data communication with a plurality of sensors, the sensors including at least one temperature sensor 13C located within the segmented battery module 13 and the BMU 13A configured to collect sensor information from the sensors; and (3) a BMU connector 13F in data communication with the BMU 13A. The electrical connection 17 is in electrical connection to the battery connector 13G of each of the energy storage devices 10. The electrical connection 17 is in electrical connection with one or more electrical connection connectors 17A. Each of the one or more electrical connection connectors 17A are connectable to one of one or more power supplies 23 of the power source 20 during a charging session for one or more of the energy storage devices 10. The MBMS 15 is in data communication with the BMU 13A of each energy storage device 10 wirelessly or by wire via the BMU connector 13F of the energy storage device 10. The pair of coolant trunks 14C includes: (1) a cool trunk 14C-1 for receiving cooled coolant; and (2) a warm trunk 14C-2 for discharging warmed coolant. The cool trunk 14C-1 is in fluid connection with each of the HE inlets 11A of the energy storage devices. The warm trunk 14C-2 is in fluid connection with each of the HE outlets 11B of the energy storage devices. A segmented coolant pathway between the external cooling unit 21 and each heat exchanger 11 is established for each energy storage device 10. The segmented coolant pathway passes through the HE flow controller 11C of the energy storage device 10. The segmented coolant pathway has an HE flow rate through the HE flow controller 11C of the energy storage device 10. The segmented coolant pathway established for each energy storage device 10 has an HE flow rate regulated by the HE flow controller 11C. During each charging session, the charging SCC 22 is in direct or indirect data communication by wire or wirelessly with: (1) the external cooling unit 21;

(2) the HE flow controller 11C of each energy storage device 10; (3) the MBMS 15; and (4) the BMU 13A of the segmented battery module 13 of each energy storage device 10 via the MBMS 15 and the BMU connector 13F of the energy storage device 10. During each charging session the charging SCC 22 is configured to directly or indirectly receive the sensor information collected by the BMU 13A of each energy storage device 10 wirelessly or by wire via the BMU connector 13F of the energy storage device 10, the sensor information including at least temperature information measured by the at least one temperature sensor 13C located within the segmented battery module 13 of the energy storage device 10. The set of parameters include at least a preferred temperature range for the segmented battery module 13 of each energy storage device 10. The step of commencing the charging session includes: (i) connecting the MBMS 15 to the charging SCC 22; and (ii) connecting the electrical connection 17 to one or more power supplies 23 via one or more electrical connection connectors 17A. The optimal range is a function of: (i) the sensor information received by the charging SCC 22 from the sensors of the energy storage device 10 via the BMU 13A of the energy storage device 10; and (ii) the preferred temperature range for the energy storage device 10.

In an alternative embodiment of the second embodiment of the external cooling invention, the charging SCC 22 is maintained in the electric vehicle or, alternatively, in the power source 20.

In an alternative embodiment of the second embodiment of the external cooling invention: (a) the cool trunk 14C-1 receives cooled coolant from the external cooling unit 21 via the ECU outlet 21A; (b) the warm trunk 14C-2 discharges warmed coolant into the external cooling unit 21 via the ECU inlet 21B; and (c) wherein the segmented coolant pathway for each energy storage device 10 exits from the external cooling unit 21 via the ECU outlet 21A, through the cool trunk 14C-1, through the HE inlet 11A of the energy storage device 10, through the HE passages 11D of the energy storage device 10, through the HE outlet 11B of the energy storage device 10, through the warm trunk 14C-2, and back into the external cooling unit 21 via the ECU inlet 21B.

In an alternative embodiment of the second embodiment of the external cooling invention, the method further comprises maintaining an external-to-internal heat exchanger 14D and an internal cooling unit 14. The internal cooling unit 14 includes an ICU inlet 14B and an ICU outlet 14A. The cool trunk 14C-1 receives cooled coolant from the internal cooling unit 14 via the ICU outlet 14A after the coolant passes through the external-to-internal heat exchanger 14D. The warm trunk 14C-2 discharges warmed coolant into the internal cooling unit 14 via the ICU inlet 14B. The segmented coolant pathway for each energy storage device 10 exits from the internal cooling unit 14 via the ICU outlet 14A, through the external-to-internal heat exchanger 14D, through the cool trunk 14C-1 of the pair of coolant trunks 14C, through the HE inlet 11A of the energy storage device 10, through the HE passages 11D of the energy storage device 10, through the HE outlet 11B of the energy storage device 10, through the warm trunk 14C-2, and back into the internal cooling unit 14 via the ICU inlet 14B. A second coolant pathway exits from the external cooling unit 21 via the ECU outlet 21A, passes through the external-to-internal heat exchanger 14D, and returns to the external cooling unit 21 via the ECU inlet 21B. This embodiment can further optionally be configured such that: (a) the charging SCC 22 is maintained in the electric vehicle; (b) the internal cooling unit 14 is in data communication with the charging SCC 22; and (c) the charging SCC 22 is configured to control coolant flow through each of the energy storage devices 10 during motorized operation of the electric vehicle. Alternatively, this embodiment can further optionally maintain an internal segmented coolant controller (SCC), where: (a) the charging SCC 22 is maintained in the power source 20; (b) the internal cooling unit 14 is in data communication with the internal SCC 16; and (c) the internal SCC 16 is configured to control coolant flow through each of the energy storage devices 10 during motorized operation of the electric vehicle.

In an alternative embodiment of the second embodiment of the external cooling invention, the method further comprises maintaining an internal cooling unit 14. The cool trunk 14C-1 receives cooled coolant from the external cooling unit 21 via the ECU outlet 21A. The warm trunk 14C-2 discharges warmed coolant into the internal cooling unit 14 via the ICU inlet 14B. The segmented coolant pathway for each energy storage device 10 exits from the external cooling unit 21 via the ECU outlet 21A, through the cool trunk 14C-1, through the HE inlet 11A of the energy storage device 10, through the HE passages 11D of the energy storage device 10, through the HE outlet 11B of the energy storage device 10, through the warm trunk 14C-2, into the internal cooling unit 14 via the ICU inlet 14B, out of the internal cooling unit 14 via the ICU outlet 14A, and back into the external cooling unit 21 via the ECU inlet 21B. This embodiment can further optionally be configured such that: (a) the charging SCC 22 is maintained in the electric vehicle; (b) the internal cooling unit 14 is in data communication with the charging SCC 22; and (c) the charging SCC 22 is configured to control coolant flow through each of the energy storage devices 10 during motorized operation of the electric vehicle. Alternatively, this embodiment can further optionally maintain an internal segmented coolant controller (SCC), where: (a) the charging SCC 22 is maintained in the power source 20; (b) the internal cooling unit 14 is in data communication with the internal SCC 16; and (c) the internal SCC 16 is configured to control coolant flow through each of the energy storage devices 10 during motorized operation of the electric vehicle.

In an alternative embodiment of the second embodiment of the external cooling invention, the charging SCC employs a control loop to: (a) adjust a power rating delivered to the external cooling unit 21; (b) according to the temperature information from the temperature sensor 13C of the segmented battery module 13 of each of the energy storage devices 10, prioritize delivery of coolant to at least one of the energy storage devices 10; and (c) adjust the HE flow rate of coolant through one or more of the HE flow controllers 11C.

In an alternative embodiment of the second embodiment of the external cooling invention, the plurality of sensors in the segmented battery module 13 of each energy storage device 10 further include a current sensor 13E configured to measure and transmit current information of the battery cells 13B of the segmented battery module 13 to the charging SCC via the BMU 13A of the energy storage device 10. Also, the set of parameters includes a thermal model for each energy storage device 10. Further, the step of periodically employing the charging SCC to calculate or recalculate the optimal range includes calculating or recalculating for each energy storage device 10: (i) a heat generation estimate for the energy storage device 10 from the thermal model of the energy storage device 10, the current information for the energy storage device 10, and the preferred temperature range for the energy storage device 10; and (ii) the optimal range for the HE flow rate of the energy storage device 10 to counteract the heat generation estimate for the energy storage device 10.

In an alternative embodiment of the second embodiment of the external cooling invention, the coolant is a fluid, water, a gas, or air.

In an alternative embodiment of the second embodiment of the external cooling invention: (a) the heat exchanger 11 and the segmented battery module 13 of each energy storage device 10 are paired in thermal conductivity via a thermal interface 12; (b) the heat exchanger 11 for each energy storage device 10 includes a heat sink conforming to at least one outer surface area of the segmented battery module 13 of the energy storage device 10; and (c) the thermal interface 12 between the heat sink and the segmented battery module 13 of each energy storage device 10 is a compressible thermally conductive material or a thermally conductive paste. The heat sink of each energy storage device 10 can comprise an aluminum shell enclosing the HE passages 11D of the energy storage device 10.

In an alternative embodiment of the second embodiment of the external cooling invention: (a) the electric vehicle is a motorized electric vehicle 1-00 including a vehicle control system and at least one traction motor 18A in electrical connection with the electrical connection 17; and (b) operation of the at least one traction motor 18A is controlled by the vehicle control system.

In an alternative embodiment of the second embodiment of the external cooling invention: (a) the electric vehicle is a power car including one or more power outlets in electrical connection to the electrical connection 17; and (b) the one or more power outlets are connectable to one or more power inlets of a motorized electric vehicle 1-00.

While various aspects and embodiments have been disclosed herein, it will be apparent that various other modifications and adaptations of the invention will be apparent to the person skilled in the art after reading the foregoing disclosure without departing from the spirit and scope of the invention and it is intended that all such modifications and adaptations come within the scope of the appended claims. The various aspects and embodiments disclosed herein are for purposes of illustration and are not intended to be limiting, with the true scope and spirit of the invention being indicated by the appended claims.

What is claimed is:

1. An external cooling system for individualized cooling of a plurality of segmented battery modules of an electric vehicle by way of a first coolant and a second coolant that flow in a first coolant pathway internal to the electric vehicle and a second coolant pathway external to the electric vehicle, respectively, the system comprising:
    a plurality of energy storage devices housed in the electric vehicle, each energy storage device comprising: a heat exchanger (HE) having a HE inlet and a HE outlet; a HE flow controller comprising a variable speed drive (VSD) coolant pump; and one of the segmented battery modules in thermal communication with the heat exchanger, wherein the segmented battery module of each energy storage device comprises: a plurality of battery cells; and a battery management unit (BMU) in data communication with a plurality of sensors, the sensors including at least one temperature sensor located within the segmented battery module, wherein the BMU is configured to collect sensor information from the sensors;
    an internal cooling unit housed in the electric vehicle and configured to generate a cold first coolant from a warm first coolant, the internal cooling unit having an ICU inlet for receiving the warm first coolant and an ICU outlet for providing the cold first coolant;
    a pair of coolant trunks housed in the electric vehicle and comprising a warm trunk configured to receive the warm first coolant from the HE outlet of each energy storage device and provide the warm first coolant to the ICU inlet; and a cool trunk configured to receive the cold first coolant from the ICU outlet and provide the cold first coolant to the HE inlet of each energy storage device, wherein the heat exchanger of each energy storage device, the pair of coolant trunks, the internal cooling unit, the ICU outlet, and the ICU inlet form the first coolant pathway as a segmented coolant pathway in which for each energy storage device a HE flow rate for the energy storage device is regulated through the HE flow controller of the energy storage device;
    an external cooling unit disposed external to the electric vehicle and providing the second coolant, the external cooling unit including an ECU inlet configured to receive a warm second coolant, and an ECU outlet configured to provide a cold second coolant, wherein the external cooling unit, the ECU inlet, and the ECU outlet form the second coolant pathway;
    an external-to-internal heat exchanger interfacing between the segmented coolant pathway and the second coolant pathway,
    wherein the external cooling unit is configured to provide additional cooling to the cold first coolant through a heat exchange between the cold first coolant and the cold second coolant using the external-to-internal heat exchanger prior to ICU outlet provision of the cold first coolant to the cool trunk, and is configured to receive the warm second coolant from the external-to-internal heat exchanger;
    a master battery management system (MBMS) housed in the electric vehicle, wherein the MBMS is in wired or wireless data communication with the BMU of each energy storage device via the BMU of the energy storage device;
    a power source disposed external to the electric vehicle, the power source electrically coupled to the plurality of energy storage devices of the electric vehicle and configured to charge the plurality of energy storage devices during a charging session, wherein the external cooling unit is housed in the power source;
    a charging segmented cooling controller (SCC), the charging SCC including a set of parameters,
    wherein during each charging session the charging SCC is in direct or indirect data communication by wire or wirelessly with:
    the external cooling unit;
    the HE flow controller of each energy storage device;
    the MBMS; and
    the BMU of the segmented battery module of each energy storage device via the MBMS and the BMU of the energy storage device;
    wherein during each charging session the charging SCC is configured to directly or indirectly receive the sensor information collected by the BMU of each energy storage device wirelessly or by wire via the BMU of the energy storage device, the sensor information including at least temperature information measured by the at least one temperature sensor located within the segmented battery module of the energy storage device;

wherein the set of parameters include at least a preferred temperature range for the segmented battery module of each energy storage device;

wherein during each charging session the charging SCC is configured to periodically:

calculate or recalculate an optimal range for the HE flow rate of the heat exchanger of each energy storage device, the optimal range a function of:

(a) the sensor information received by the charging SCC from the sensors of the energy storage device via the BMU of the energy storage device; and (b) the preferred temperature range for the energy storage device; and control by wire or wirelessly the HE flow rate of each energy storage device, via the direct or indirect data communication with the HE flow controller of the energy storage device, to maintain the HE flow rate within the optimal range; and wherein the charging SCC is housed in the power source and, for each energy storage device, data communication between the charging SCC and the HE flow controller of the energy storage device does not pass through either:

the MBMS of the motorized electric vehicle; or the BMU of the energy storage device; and wherein during each charging session the charging SCC is configured to prioritize individual cooling needs of the segmented battery modules by increasing or decreasing the flow of the cold first coolant through the HE flow controller of each energy storage device to establish an individualized flow of the cold first coolant to each energy storage device.

2. The system of claim 1, wherein during each charging session the charging SCC is configured to directly control the HE flow controller of each energy storage device of the electric vehicle.

3. The system of claim 1, wherein the system further comprises a control loop, and wherein during each charging session the charging SCC employs the control loop to:

adjust a power rating delivered to the external cooling unit;

prioritize delivery of the cold first coolant to at least one of the energy storage devices according to the sensor information of the segmented battery module of each of the energy storage devices; and adjust the HE flow rate of the cold first coolant through one or more of the HE flow controllers.

4. The system of claim 1, wherein the set of parameters includes a thermal model for each energy storage device and a preferred temperature range for each energy storage device, and wherein the charging SCC calculates for each energy storage device (i) an estimated heat generation for the energy storage device using the thermal model, as well as the preferred temperature range, and current information of the sensor information of the energy storage device; and (ii) the optimal range for the HE flow rate of the energy storage device to counteract the estimated heat generation-estimate for the energy storage device.

5. The system of claim 1, wherein each of the first coolant and the second coolant is a fluid, water, a gas, or air.

6. The system of claim 1, (a) wherein the heat exchanger and the segmented battery module of each energy storage device are paired in thermal conductivity via a thermal interface;

(b) wherein the heat exchanger for each energy storage device includes a heat sink conforming to at least one outer surface area of the segmented battery module of the energy storage device; and (c) wherein the thermal interface between the heat sink and the segmented battery module of each energy storage device is a compressible thermally conductive material or a thermally conductive paste.

7. The system of claim 6, wherein the heat sink of each energy storage device comprises an aluminium shell enclosing the HE passages of the energy storage device.

8. The system of claim 1, (a) wherein the electric vehicle comprises a locomotive including a vehicle control system and at least one traction motor in electrical connection with the electrical connection; and (b) wherein operation of the at least one traction motor is controlled by the vehicle control system.

9. The system of claim 1, wherein the electric vehicle is a power car corresponding to a locomotive, and which includes one or more power outlets electrically couplable to one or more power inlets of the locomotive.

10. A computer-implemented external cooling method for individualized cooling of a plurality of segmented battery modules of an electric vehicle by way of a first coolant and a second coolant that flow that flow in a first coolant pathway internal to the electric vehicle and a second coolant pathway external to the electric vehicle, respectively, the method comprising:

maintaining a plurality of energy storage devices housed in the electric vehicle, each energy storage device comprising: a heat exchanger (HE) having a HE inlet and a HE outlet; a HE flow controller comprising a Variable Speed Drive (VSD) coolant pump; and one of the segmented battery modules in thermal communication with the heat exchanger, wherein the segmented battery module of each energy storage device comprises: a plurality of battery cells; and a battery management unit (BMU) in data communication with a plurality of sensors, the sensors including at least one temperature sensor located within the segmented battery module, wherein the BMU is configured to collect sensor information from the sensors;

maintaining an internal cooling unit configured to generate a cold first coolant from a warm first coolant, the internal cooling unit having an ICU inlet for receiving the warm first coolant and an ICU outlet for providing the cold first coolant;

maintaining a pair of coolant trunks housed in the electric vehicle and comprising a warm trunk configured to receive the warm first coolant from each HE outlet and provide the warm first coolant to the ICU inlet; and a cool trunk configured to receive the cold first coolant from the ICU outlet and provide the cold first coolant to each HE inlet, wherein the heat exchanger of each energy storage device, the pair of coolant trunks, the internal cooling unit, the ICU outlet, and the ICU inlet form the first coolant pathway as a segmented coolant pathway in which for each energy storage device a HE flow rate for the energy storage device is regulated through the HE flow controller of the energy storage device;

maintaining an external cooling unit disposed external to the electric vehicle and providing the second coolant, the external cooling unit including an ECU inlet configured to receive a warm second coolant, and an ECU outlet configured to provide a cold second coolant, wherein the external cooling unit, the ECU inlet, and the ECU outlet form the second coolant pathway;

maintaining an external-to-internal heat exchanger interfacing between the segmented coolant pathway and the second coolant pathway;

establishing communication between a master battery management system (MBMS) housed in the electric vehicle and the BMU of each energy storage device configured to collect the sensor information;

maintaining a power source disposed external to the electric vehicle, the power source electrically coupled to the plurality of energy storage devices of the electric vehicle and configured to charge the plurality of energy storage devices during a charging session, wherein the external cooling unit is housed in the power source;

providing, during the charging session, additional cooling to the cold first coolant from the cold second coolant through a heat exchange between the cold first coolant and the cold second coolant using the external-to-internal heat exchanger prior to ICU outlet provision of the cold first coolant to the cool trunk; and receiving, during the charging session, a warm second coolant from the external-to-internal heat exchanger into the external cooling unit through the ECU inlet during the charging session;

maintaining a charging segmented cooling controller (SCC), the charging SCC including a set of parameters, wherein during each charging session the charging SCC is in direct or indirect data communication by wire or wirelessly with:

the external cooling unit;
the HE flow controller of each energy storage device;
the MBMS; and
the BMU of the segmented battery module of each energy storage device via the MBMS and the BMU of the energy storage device;

wherein during each charging session the charging SCC is configured to directly or indirectly receive the sensor information collected by the BMU of each energy storage device wirelessly or by wire via the BMU of the energy storage device, the sensor information including at least temperature information measured by the at least one temperature sensor located within the segmented battery module of the energy storage device;

wherein the set of parameters include at least a preferred temperature range for the segmented battery module of each energy storage device;

wherein the charging SCC is maintained in the power source and, for each energy storage device, data communication between the charging SCC and the HE flow controller of the energy storage device does not pass through either:

the MBMS of the electric vehicle; or
the BMU of the energy storage device;

commencing the charging session for the plurality of energy storage devices;

during the charging session, periodically employing the charging SCC to calculate or recalculate an optimal range for the HE flow rate of the heat exchanger of each energy storage device, the optimal range a function of:
(a) the sensor information received by the charging SCC from the sensors of the energy storage device via the BMU of the energy storage device; and
(b) the preferred temperature range for the energy storage device; and during the charging session, controlling by wire or wirelessly the HE flow rate of each energy storage device, via the direct or indirect data communication with the HE flow controller of the energy storage device, to maintain the HE flow rate within the optimal range, such that the SCC prioritizes individual cooling needs of the segmented battery modules by way of increasing or decreasing flow of the cold first coolant through the HE flow controller of each energy storage device to establish an individualized flow of the cold first coolant to each energy storage device.

11. The method of claim 10, wherein during each charging session the charging SCC directly controls the HE flow controller of each energy storage device of the electric vehicle.

12. The method of claim 10, further comprising maintaining a control loop during each charging session, wherein during each charging session the charging SCC employs the control loop to:
(a) adjust a power rating delivered to the external cooling unit;
(b) prioritize delivery of the cold first coolant to at least one of the energy storage devices according to a temperature indicated by the temperature sensor of the segmented battery module of each of the energy storage devices; and
(c) adjust through the control loop the HE flow rate of the cold first coolant through one or more of the HE flow controllers.

13. The method of claim 10, further comprising calculating by way of the SCC, for each energy storage device, (i) an estimated heat generation for the energy storage device using: a thermal model of the energy storage device from the set of parameters, a preferred temperature range for the energy storage device and current sensor information of the energy storage device, and (ii) an optimal range of the HE flow rate of the energy storage device to counteract the estimated heat generation of the energy storage device.

14. The method of claim 10, wherein each of the first coolant and the second coolant is a fluid, water, a gas, or air.

15. The method of claim 10,
(a) wherein the heat exchanger and the segmented battery module of each energy storage device are paired in thermal conductivity via a thermal interface;
(b) wherein the heat exchanger for each energy storage device includes a heat sink conforming to at least one outer surface area of the segmented battery module of the energy storage device; and
(c) wherein the thermal interface between the heat sink and the segmented battery module of each energy storage device is a compressible thermally conductive material or a thermally conductive paste.

16. The method of claim 15, wherein the heat sink of each energy storage device comprises an aluminium shell enclosing the HE passages of the energy storage device.

17. The method of claim 10,
wherein the electric vehicle comprises a locomotive including a vehicle control system and at least one traction motor, and
operation of the at least one traction motor is controlled by the vehicle control system.

18. The method of claim 10,
wherein the electric vehicle is a power car corresponding to a locomotive, and which includes one or more power outlets, and
the one or more power outlets are electrically couplable to one or more power inlets of the locomotive.

* * * * *